United States Patent
Yamashita et al.

(10) Patent No.: US 9,558,152 B2
(45) Date of Patent: Jan. 31, 2017

(54) SYNCHRONIZATION METHOD, MULTI-CORE PROCESSOR SYSTEM, AND SYNCHRONIZATION SYSTEM

(71) Applicant: FUJITSU LIMITED, Kawasaki (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 593 days.

(21) Appl. No.: 14/026,469

(22) Filed: Sep. 13, 2013

(65) Prior Publication Data
US 2014/0019717 A1  Jan. 16, 2014

Related U.S. Application Data

(63) Continuation of application No. PCT/JP2011/056262, filed on Mar. 16, 2011.

(51) Int. Cl.
*G06F 9/46* (2006.01)
*G06F 15/78* (2006.01)
(Continued)

(52) U.S. Cl.
CPC ....... *G06F 15/7839* (2013.01); *G06F 9/30087* (2013.01); *G06F 9/3842* (2013.01);
(Continued)

(58) Field of Classification Search
None
See application file for complete search history.

(56) References Cited

U.S. PATENT DOCUMENTS 5,307,495 A * 4/1994 Seino ............... G06F 9/52
712/28
6,581,089 B1  6/2003 Imamura
(Continued)

FOREIGN PATENT DOCUMENTS

JP  07-200486  *  8/1995
JP  7-200486     8/1995
(Continued)

OTHER PUBLICATIONS

Japanese International Preliminary Report on Patentability issued Sep. 26, 2013 in corresponding International Application No. PCT/JP2011/056262.
(Continued)

*Primary Examiner* — Abdullah Al Kawsar
*Assistant Examiner* — Caroline H Arcos
(74) *Attorney, Agent, or Firm* — Staas & Halsey LLP

(57) ABSTRACT

A synchronization method is executed by a multi-core processor system. The synchronization method includes registering based on a synchronous command issued from a first CPU, CPUs to be synchronized and a count of the CPUs into a specific table; counting by each of the CPUs and based on a synchronous signal from the first CPU, an arrival count for a synchronous point, and creating by each of the CPUs, a second shared memory area that is a duplication of a first shared memory area accessed by processes executed by the CPUs; and comparing the first shared memory area and the second shared memory area when the arrival count becomes equal to the count of the CPUs, and based on a result of the comparison, judging the processes executed by the CPUs.

4 Claims, 14 Drawing Sheets

(51) Int. Cl.
  *G06F 9/52* (2006.01)
  *G06F 9/54* (2006.01)
  *G06F 15/167* (2006.01)
  *G06F 9/45* (2006.01)
  *G06F 9/38* (2006.01)
  *G06F 9/30* (2006.01)

(52) U.S. Cl.
  CPC ............. *G06F 9/52* (2013.01); *G06F 9/544* (2013.01); *G06F 8/458* (2013.01); *G06F 9/3834* (2013.01); *G06F 9/3838* (2013.01); *G06F 9/3885* (2013.01); *G06F 9/467* (2013.01); *G06F 15/167* (2013.01); *G06F 2212/507* (2013.01)

(56) References Cited

U.S. PATENT DOCUMENTS

| | | | | |
|---|---|---|---|---|
| 9,009,020 | B1* | 4/2015 | Oskin | G06F 9/455 703/22 |
| 2003/0028755 | A1 | 2/2003 | Ohsawa et al. | |
| 2006/0117149 | A1* | 6/2006 | Sugizaki | G06F 12/0831 711/146 |
| 2006/0212868 | A1* | 9/2006 | Takayama | G06F 9/52 718/100 |
| 2007/0143755 | A1* | 6/2007 | Sahu | G06F 9/30087 718/100 |
| 2009/0279549 | A1* | 11/2009 | Ramanathan | G06F 8/65 370/395.4 |
| 2010/0153700 | A1 | 6/2010 | Capps, Jr. et al. | |

FOREIGN PATENT DOCUMENTS

| | | | |
|---|---|---|---|
| JP | 2780623 | | 7/1998 |
| JP | 11-306038 | | 11/1999 |
| JP | 2000-47887 | | 2/2000 |
| JP | 2000-215182 | * | 8/2000 |
| JP | 2003-29986 | | 1/2003 |
| JP | 3702815 | | 10/2005 |
| JP | 2010-146550 | * | 7/2010 |

OTHER PUBLICATIONS

Japanese Office Action dated Oct. 7, 2014 in corresponding Japanese Patent Application No. 2013-504460.

International Search Report mailed Jun. 21, 2011 in corresponding International Application No. PCT/JP2011/056262.

* cited by examiner

FIG.4

| PID | PPID | PGID | CPU No. |
|---|---|---|---|
| 1001 | 1 | 1001 | #1 |
| 1002 | 1001 | 1001 | #4 |
| 1003 | 1001 | 1001 | #5 |
| 1004 | 1001 | 1001 | #6 |
| 1005 | 1001 | 1001 | #8 |
| 1006 | 1 | 1006 | #0 |
| 1007 | 1006 | 1006 | #2 |
| ⋮ | ⋮ | ⋮ | ⋮ |

FIG.5

| NUMBER OF CPUs TO BE SYNCHRONIZED | SYNCHRONIZATION-OBJECT CPU |
|---|---|
| 4 | #1, #4, #5, #6, #8 |
| ⋮ | ⋮ |

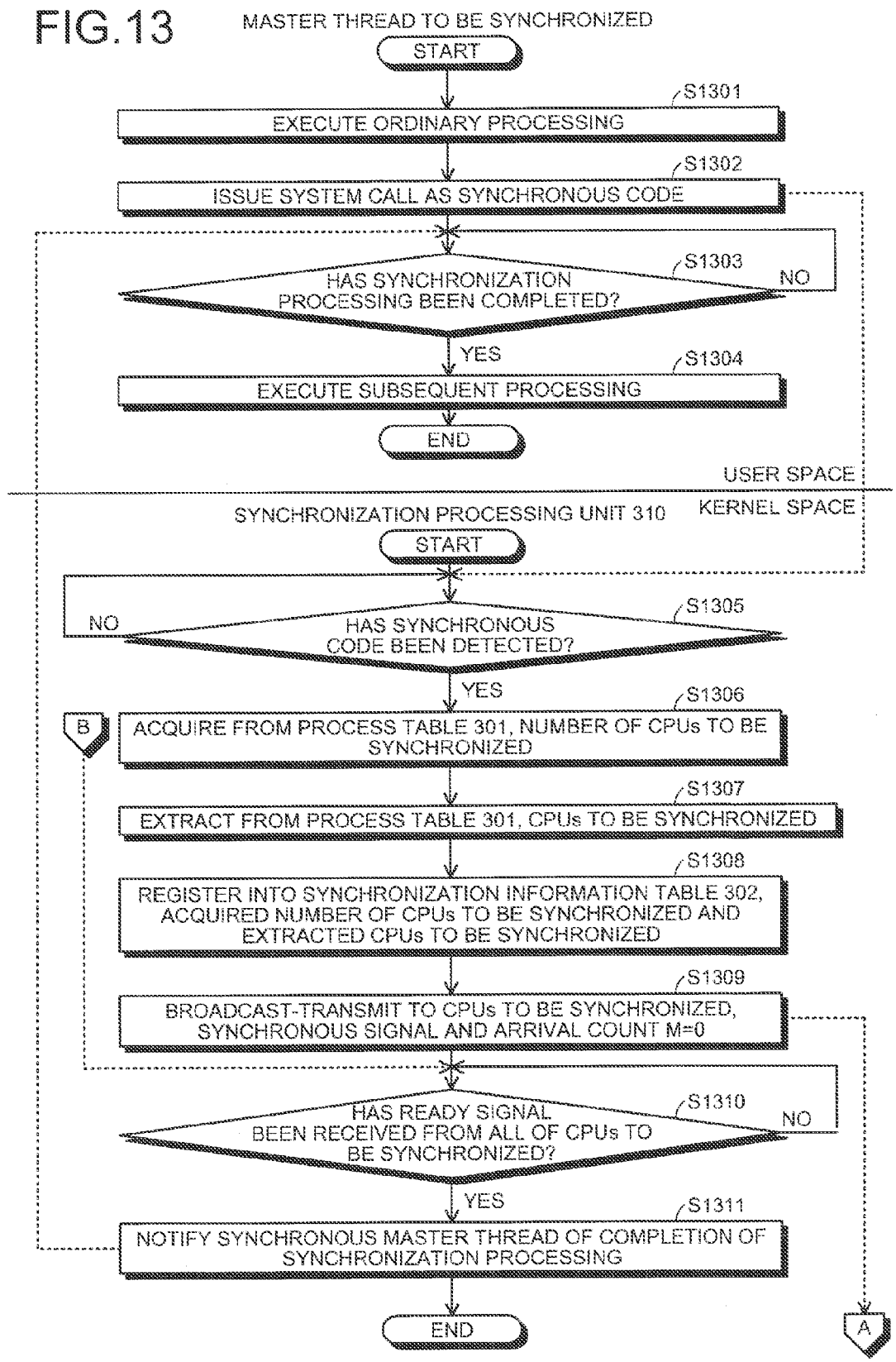

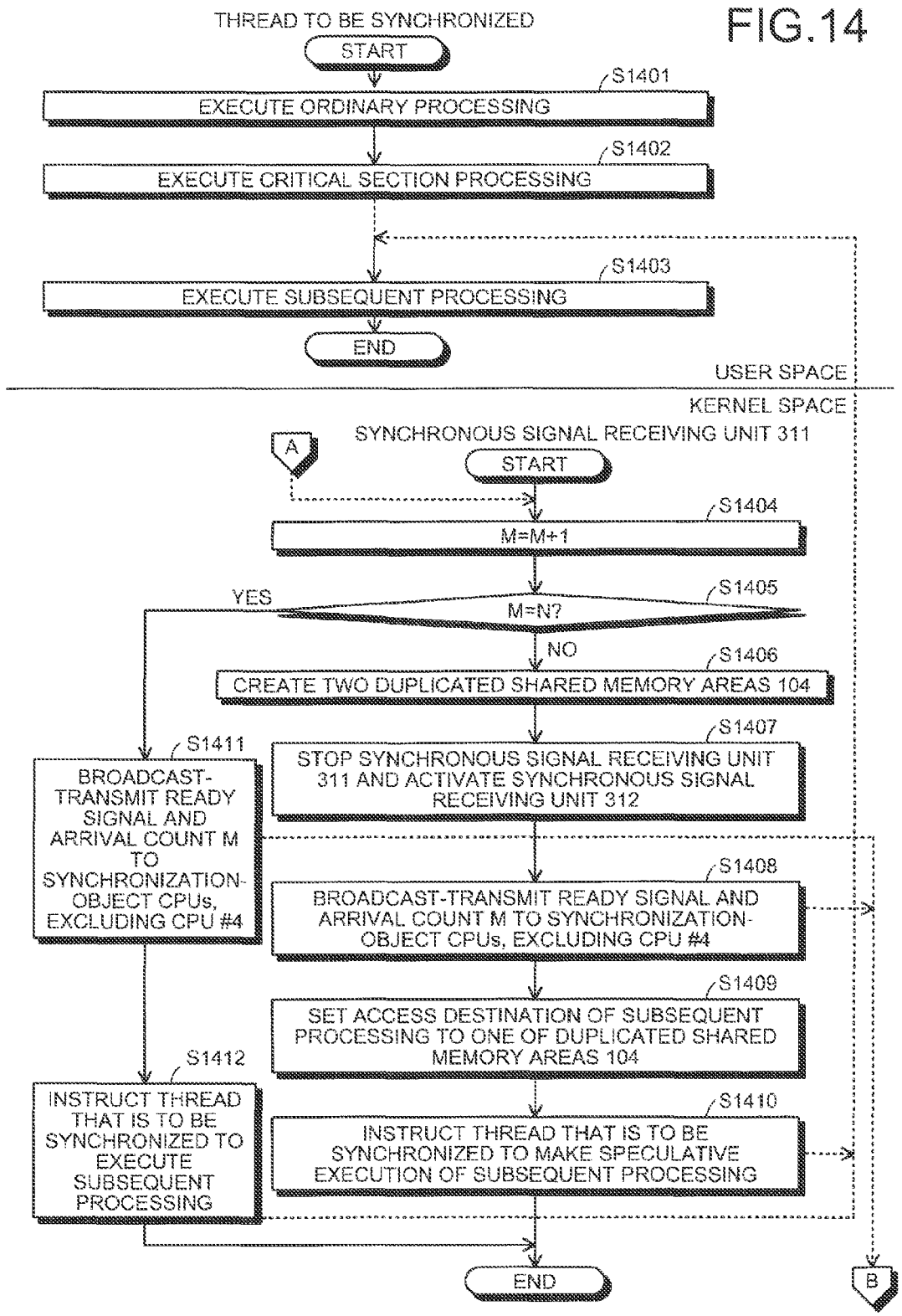

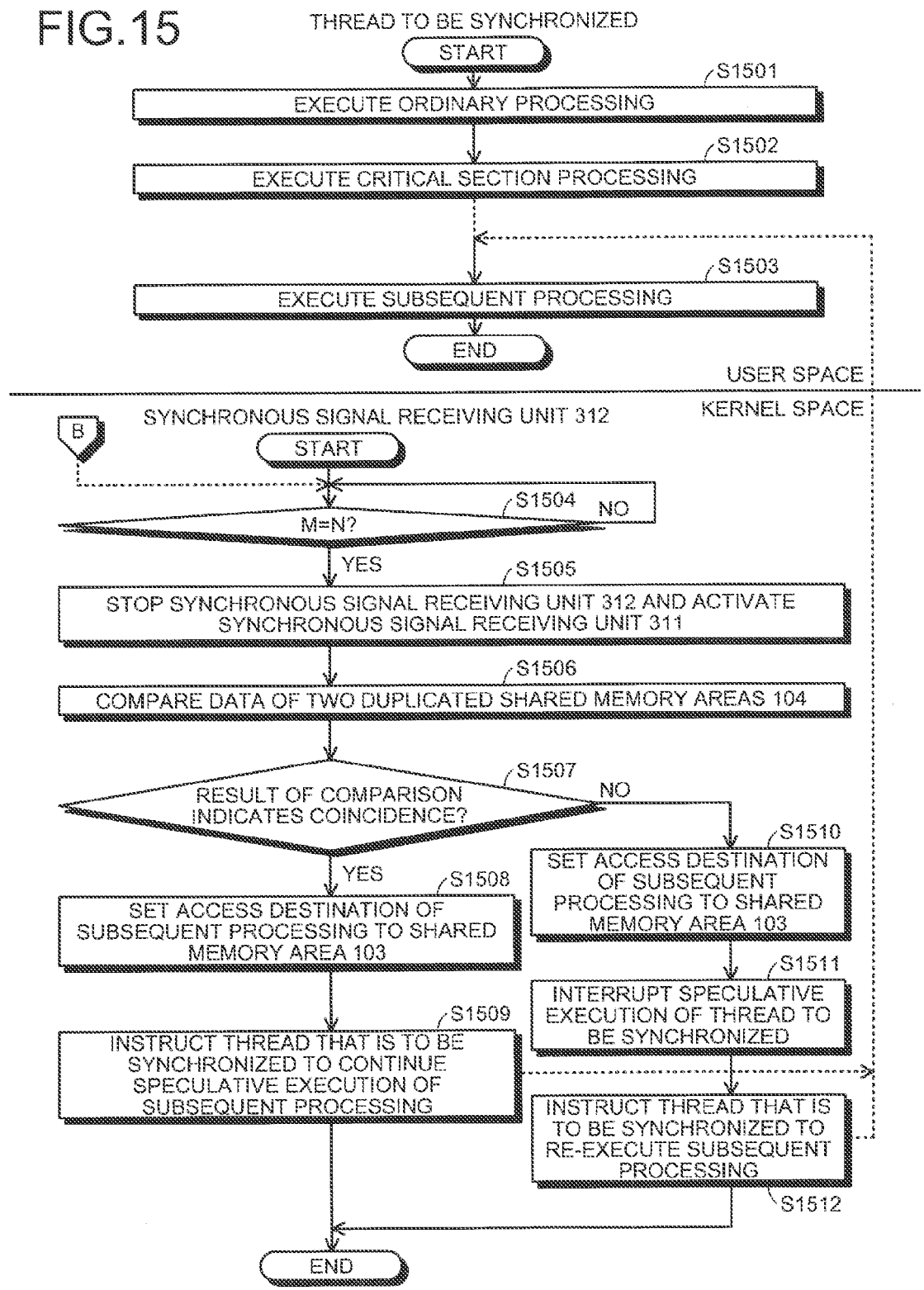

SYNCHRONIZATION METHOD, MULTI-CORE PROCESSOR SYSTEM, AND SYNCHRONIZATION SYSTEM

CROSS REFERENCE TO RELATED APPLICATIONS

This application is a continuation application of International Application PCT/JP2011/056262, filed on Mar. 16, 2011 and designating the U.S., the entire contents of which are incorporated herein by reference.

FIELD

The embodiment discussed herein is related to a synchronization method, a multi-core processor system, and a synchronization system.

BACKGROUND

Up until now there has been a multi-programming technique of running plural programs for a single central processing unit (CPU). For example, an operating system (OS) has a function of dividing the processing time of the CPU and allocates a process or a thread to the divided time to allow the CPU to operate plural processes or threads at the same time. The process and the thread are units in which a program is executed. Software is a set of the processes or the threads. In general, each process has an independent memory space and threads have a shared memory space.

Recently, an increasing number of apparatuses employ a multi-core processor system that is a computer having plural CPUs, in place of a single-core processor system that is a computer having a single CPU. High-speed processing is possible by allocating plural threads to plural CPUs in parallel.

In the case of such a parallel execution of the plural threads, synchronization processing is frequently executed to achieve thread-to-thread synchronization. The synchronization processing can be exclusive control processing or barrier synchronization processing.

The exclusive control processing is processing in which once one thread acquires a right of use of a resource, etc., the other threads are placed in wait state until the one thread releases the resource use right. For example, when plural threads access shared data, the exclusive control processing is added to the program. The barrier synchronization processing is processing in which processing of plural threads is stopped at a specific code position and, when all threads reach the specific code position, proceeds to the next processing. For example, when requiring a concurrent execution of plural threads from a specific position, the barrier synchronization processing is added to the program.

The OS provides a synchronous command to perform the synchronization processing to application software (app) in a library, etc. For example, the synchronous command to perform the exclusive control processing can be a Mutex and the synchronous command to perform the barrier synchronization processing can be a barrier synchronous command.

A CPU declaring the start of the synchronization processing sends, consequent to the synchronous command, a synchronous signal to a CPU that is to receive the synchronization processing. The CPU having received the synchronous signal sends to the CPU that sent the synchronous signal, a signal indicating completion of the synchronization processing. Hereafter, a signal indicating completion of the synchronization processing is referred to as a ready signal.

Relating to the synchronization processing, for example, a technique is disclosed that has a synchronization counting unit that counts the number of CPUs reaching a synchronous point during the thread-to-thread synchronization processing, to determine whether all the CPUs have reached the synchronous point. The synchronous point refers to a position where the synchronous command is inserted in an execution code. Relating to CPUs' register synchronization processing, for example, a technique for speculative execution is disclosed that, each time a parent thread general-purpose register is written to after thread copying, sends a value of the updated general-purpose register from the parent thread CPU to a child thread CPU (see, e.g., Japanese Laid-Open Patent Publication Nos. H7-200486 and 2003-29986).

Although rapid confirmation of completion of the synchronization processing is possible in the above techniques, unnecessary waiting occurs if redundant synchronization processing is set by the designer, resulting in decreased performance.

SUMMARY

According to an aspect of an embodiment, a synchronization method is executed by a multi-core processor system, and includes registering based on a synchronous command issued from a first CPU, CPUs to be synchronized and a count of the CPUs into a specific table; counting by each of the CPUs and based on a synchronous signal from the first CPU, an arrival count for a synchronous point, and creating by each of the CPUs, a second shared memory area that is a duplication of a first shared memory area accessed by processes executed by the CPUs; and comparing the first shared memory area and the second shared memory area when the arrival count becomes equal to the count of the CPUs, and based on a result of the comparison, judging the processes executed by the CPUs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of the contents of a process table 301;

FIG. 5 is an explanatory view of an example of the contents of a synchronization information table 302;

FIG. 13 is a flowchart of an example of a procedure at a synchronous master CPU during synchronization processing;

FIG. 14 is a flowchart (1) of an example of a procedure at a CPU to be synchronized during the synchronization processing; and FIG. 15 is a flowchart (2) of an example of a procedure performed at the CPU to be synchronized during the synchronization processing.

DESCRIPTION OF EMBODIMENTS

An embodiment of a synchronization method, a multi-core processor system, and synchronization system will be described in detail with reference to the accompanying drawings.

Figure 1:
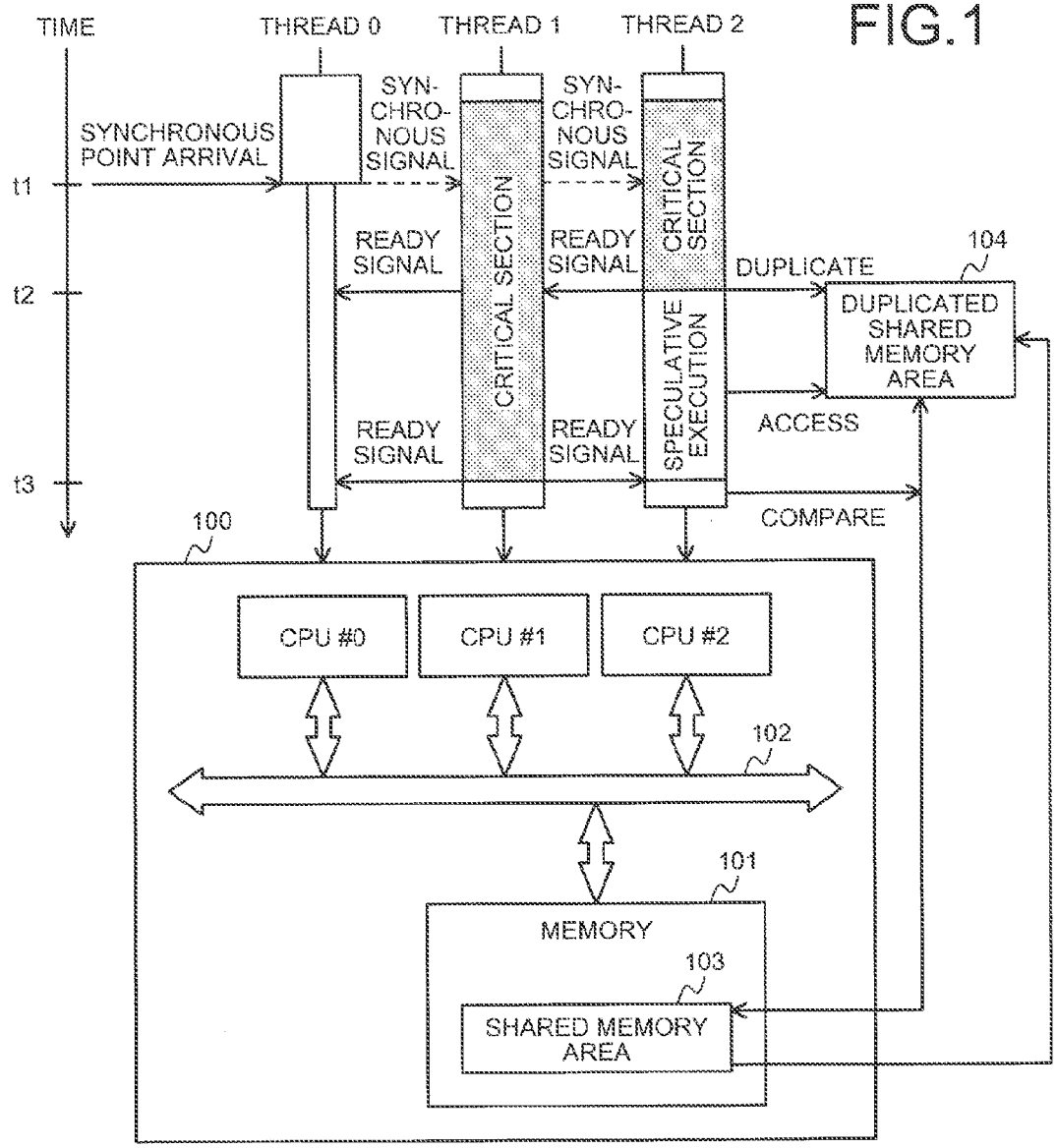
FIG. 1 is an explanatory view of an operation example of a multi-core processor system 100.

FIG. 1 is an explanatory view of an operation example of a multi-core processor system 100. The multi-core processor system 100 includes CPUs #0 to #2 and a memory 101. Hereafter, a symbol with suffix "#n" means a symbol corresponding to an n-th CPU. The CPUs #0 to #2 and the memory 101 are connected via a bus 102. The CPUs #0 to #2 control the multi-core processor system 100. The memory 101 is a storage area accessible by the CPUs #0 to #2. The memory 101 includes a shared memory area 103. The shared memory area 103 is an area accessed by the CPUs #0 to #2 in a shared manner.

The CPUs #0 to #2 execute threads 0 to 2 for parallel processing. FIG. 1 assumes a case where at time t1, the CPU #0 executes a synchronous command as a result of accessing the shared memory area 103 according to the execution code of the thread 0. The position of the synchronous command in the execution code is defined as the synchronous point. When the synchronous command at the executable position is reached, this state is referred to as arrival at the synchronous point.

Like the thread 0, a thread declaring the start of the synchronization processing and monitoring the synchronous state of the other threads is referred to as a synchronous master thread. A CPU executing the synchronous master thread is referred to as a synchronous master CPU. Similarly, the other threads subjected to synchronization processing are referred to as synchronized threads and CPUs executing the synchronized threads are referred to as CPUs to be synchronized. The threads 1 and 2 are synchronized threads. The CPUs performing the synchronization processing are referred to as synchronization-object CPUs. The synchronization-object CPUs include the synchronous master CPU and the CPUs to be synchronized. In the example of FIG. 1, the synchronization-object CPUs are CPUs #0 to #2, the synchronous master CPU is the CPU #0, and the CPUs to be synchronized are CPUs #1 and #2.

When executing the synchronous command, the synchronous master CPU sends a synchronous signal to the CPUs to be synchronized. Accordingly, the CPU #0 sends a synchronous signal to the CPUs #1 and #2 at time t1.

At the time t1, however, the CPUs #1 and #2 are in critical sections and cannot receive the synchronous signal. A critical section means a portion disabling interrupt of other processing. When the CPU #2 completes the critical section at the time t2, the CPU #2 receives the synchronous signal.

The CPU #2 receiving the synchronous signal creates a copied shared memory area 104 that is a duplicate of the shared memory area 103. The CPU #2 accesses the copied shared memory area 104 to perform a speculative execution of the subsequent processing of the thread 2. As notification of arrival at the synchronous point, the CPU #2 sends a ready signal to the CPUs #0 and #1.

When the CPU #1 completes the critical section at time t3, the CPU #1 receives the synchronous signal. The CPU #1 receiving the synchronous signal sends a ready signal to the CPUs #0 and #2. When the CPU #2 receiving the ready signal determines that all the CPUs to be synchronized have arrived at the synchronous point, the CPU #2 compares data of the shared memory area 103 with data of the copied shared memory area 104. If the comparison result indicates coincidence, the CPU #2 determines the insertion of a synchronous code as being redundant to continue the speculative execution. A method of determining whether all the CPUs to be synchronized arrive at the synchronous point will be described with reference to FIGS. 7 to 11.

In the case of the synchronization processing of N CPUs, the multi-core processor system 100 duplicates data to perform the speculative execution if M<N where M is the arrival count for the synchronous point, but, if M=N, speculative execution is continued when data to be duplicated coincides with duplicate data. This enables the multi-core processor system 100 to obviate drops in performance arising from redundant synchronization processing.

Figure 2:
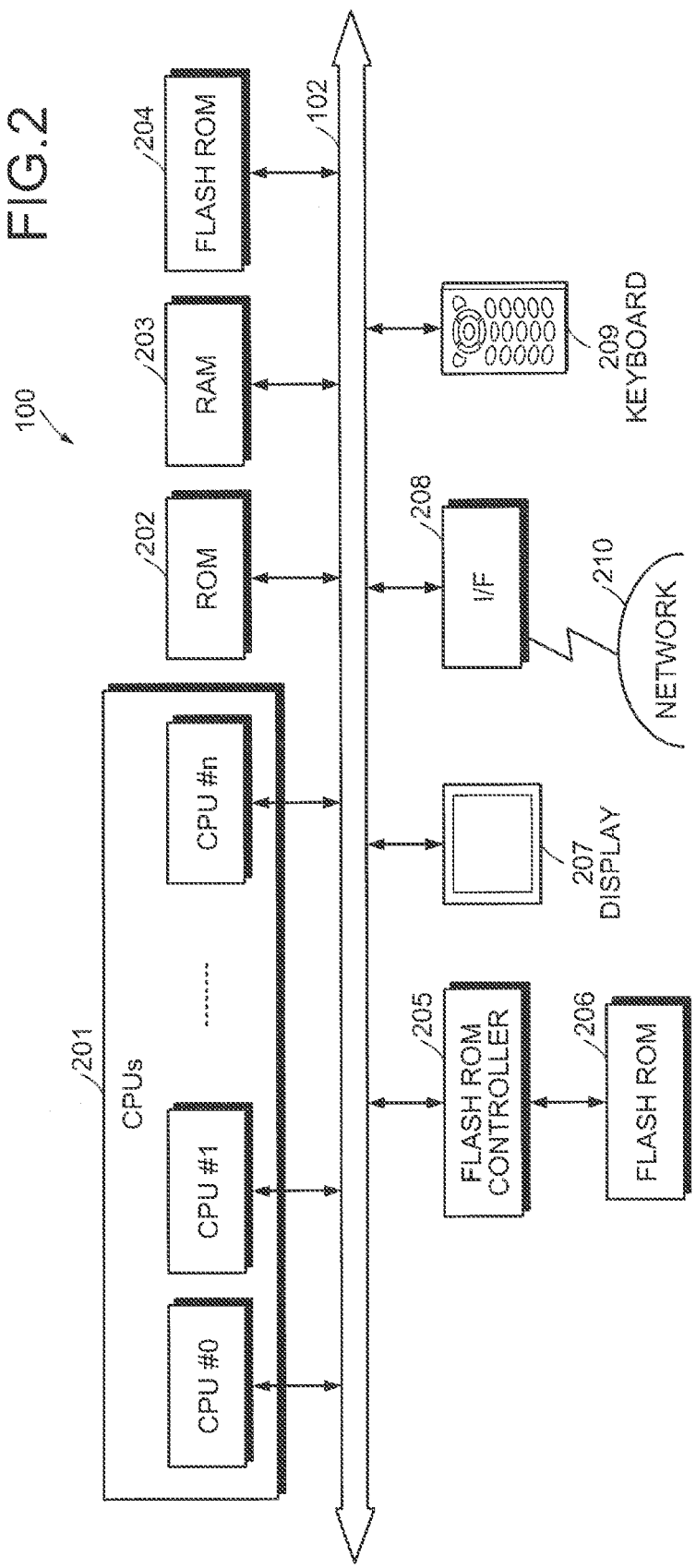
FIG. 2 is a block diagram of a hardware example of the multi-core processor system 100 according to a first embodiment.

FIG. 2 is a block diagram of a hardware example of the multi-core processor system 100 according to a first embodiment. Referring to FIG. 2, the multi-core processor system 100 includes plural CPUs 201, read-only memory (ROM) 202, and random access memory (RAM) 203.

The multi-core processor system 100 includes a flash ROM 204, a flash ROM controller 205, and a flash ROM 206. The multi-core processor system 100 includes, as I/O devices from/to the user or other devices, a display 207, an interface (I/F) 208, and a keyboard 209. The elements are connected together via the bus 102. The memory 101 depicted in FIG. 1 may be the RAM 203 or part of the RAM 203. The memory 101 may include the ROM 202, the flash ROM 204, and the flash ROM 206 that act as storage areas other than the RAM 203.

The CPUs 201 provides overall control of the multi-core processor system 100. The CPUs 201 refers to all CPUs having single-core processors connected in parallel. The CPUs 201 includes CPUs #0 to #n. n is an integer greater than or equal to 2. The CPUs #0 to #n may have respective dedicated cache memory. The multi-core processor system refers to a computer system including a processor equipped with plural cores. As long as plural cores are provided, a single processor having multiple cores or a group of single-core processors arranged in parallel may be provided. In this embodiment, description will be given of an example in which the CPUs are single-core processors are arranged in parallel.

The ROM 202 stores programs such as a boot program. The RAM 203 is used as a work area of the CPUs 201. The flash ROM 204 is a flash ROM with high readout speed and is, for example, NOR flash memory. The flash ROM 204 stores system software such as the OS, application software, etc. When updating the OS for example, the multi-core processor system 100 receives a new OS via the I/F 208 and updates the old OS stored in the flash ROM 204 to the received new OS.

The flash ROM controller 205 controls the reading and writing of data with respect to the flash ROM 206 under the control of the CPUs 201. The flash ROM 206 is a flash ROM having a primary purpose of data saving and data delivery and is, for example, NAND flash memory. The flash ROM 206 stores data written thereto under the control of the flash ROM controller 205. The data to be stored may be, for example, image data or video data acquired through the I/F 208 by the user using the multi-core processor system 100 or a program executing the synchronization method according to this embodiment. The flash ROM 206 may be a memory card, an SD card, etc.

The display 207 displays, for example, data such as text, images, functional information, etc., in addition to a cursor, icons, and/or tool boxes. A thin-film-transistor (TFT) liquid crystal display and the like may be employed as the display 207

The I/F 208 is connected to a network 210 such as a local area network (LAN), a wide area network (WAN), and the Internet through a communication line and is connected to other apparatuses through the network 210. The I/F 208 administers an internal interface with the network 210 and controls the input and output of data with respect to external apparatuses. For example, a modem or a LAN adaptor may be employed as the I/F 208.

The keyboard 209 includes, for example, keys for inputting letters, numerals, and various instructions and performs the input of data. Alternatively, a touch-panel-type input pad or numeric keypad, etc. may be adopted.

Figure 3:
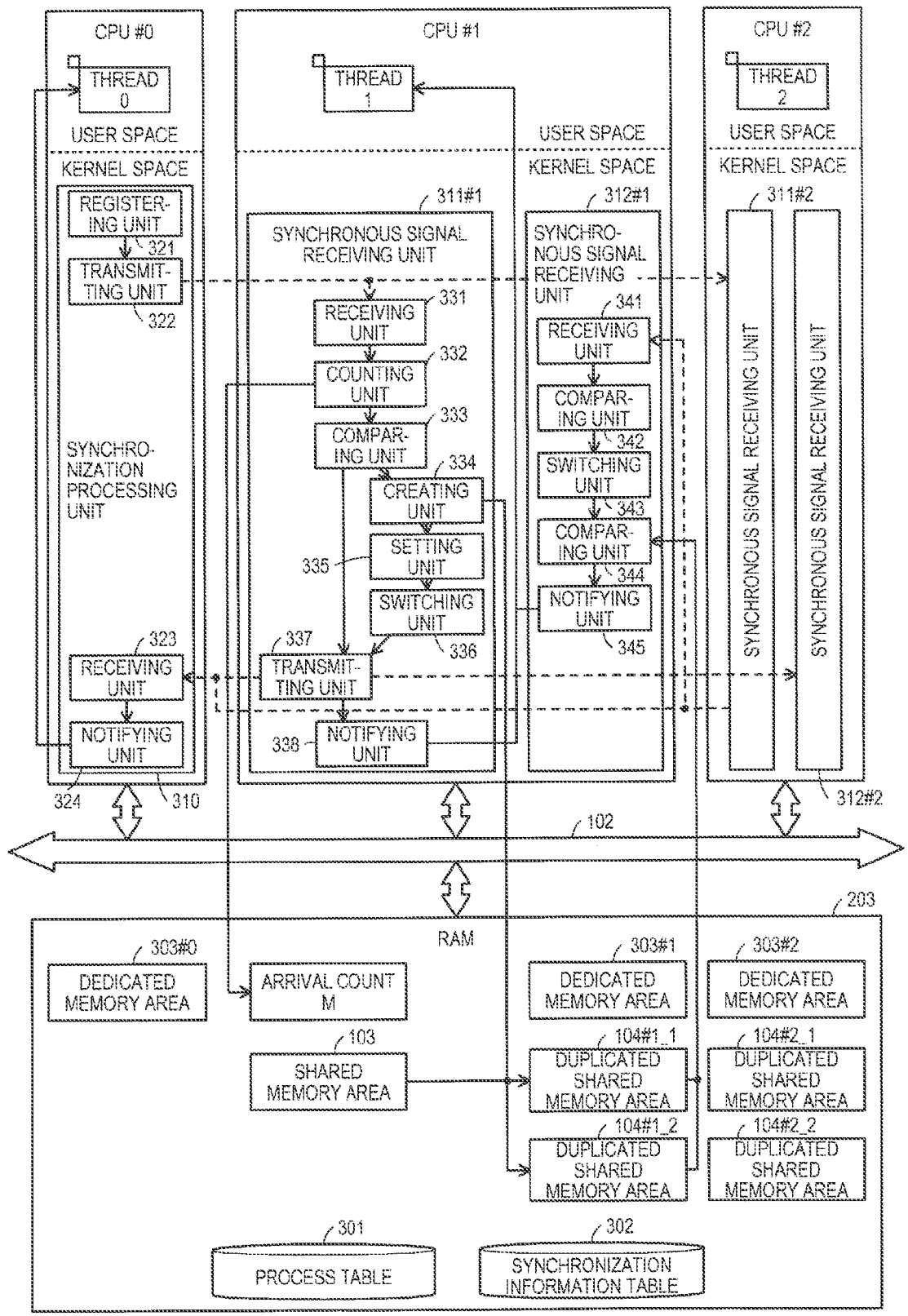
FIG. 3 is a functional diagram of the multi-core processor system 100.

Functions of the multi-core processor system 100 will be described. FIG. 3 is a functional diagram of the multi-core processor system 100. The multi-core processor system 100 has access to a process table 301 and a synchronization information table 302 that are accessed by the functions. The CPUs #0 to #2 have access to respective dedicated memory areas 303#0 to 303#2.

The multi-core processor system 100 includes a synchronization processing unit 310 and synchronous signal receiving units 311 and 312. The synchronization processing unit 310 is a function included in the synchronous master CPU and the synchronous signal receiving units 311 and 312 are functions included in the CPUs to be synchronized. The synchronization processing unit 310 and the synchronous signal receiving units 311 and 312 operate in kernel spaces of the CPUs #0 to #2. The synchronization processing unit 310 includes a registering unit 321, a transmitting unit 322, a receiving unit 323, and a notifying unit 324. The synchronous signal receiving unit 311 includes a receiving unit 331, a counting unit 332, a comparing unit 333, a creating unit 334, a setting unit 335, a switching unit 336, a transmitting unit 337, and notifying unit 338. The synchronous signal receiving unit 312 includes a receiving unit 341, a comparing unit 342, a switching unit 343, a comparing unit 344, and notifying unit 345.

Functions (the registering unit 321 to the notifying unit 345) providing a control unit are implemented by executing on the CPUs #0 to #n, a program stored in a storage device. The storage device is, for example, the ROM 202, the RAM 203, the flash ROM 204, the flash ROM 206, etc., depicted in FIG. 2. The functions may be implemented by other CPUs via the I/F 208.

The multi-core processor system 100 depicted in FIG. 3 assumes that the CPU #0 executes a thread 0 in the user space, that the CPU #1 executes a thread 1 in the user space, and that the CPU #2 executes a thread 2 in the user space. FIG. 3 assumes that the thread 1 is the synchronous master thread, that the CPU #0 is the synchronous master CPU, and that the CPUs #1 and #2 are the CPUs to be synchronized. For example, when the thread 1 is the synchronous master thread, the functions of the synchronization processing unit 310 are included in the CPU #1.

The synchronous signal receiving units 311#1 and 312#1 are functions of the CPU #1 that is the CPU to be synchronized and the synchronous signal receiving units 311#2 and 312#2 are functions of the CPU #2 that is the CPU to be synchronized. Although not depicted in FIG. 3, the synchronous signal receiving unit 311#2 includes functions equivalent to the receiving unit 331 to the notifying unit 338 and the synchronous signal receiving unit 312#2 includes functions equivalent to the receiving unit 341 to the notifying unit 345.

The process table 301 is a table associating the threads with the CPUs 201. The process table 301 is updated each time a thread is created or completed by the OS, etc. The details of the process table 301 will be described later with reference to FIG. 4. The synchronization information table 302 stores the number of CPUs to be subjected to the synchronization processing and CPU numbers (Nos). The details of the synchronization information table 302 will be described later with reference to FIG. 5.

The dedicated memory area 303 is a memory area dedicated for access by the CPUs. For example, the CPU #0 stores data accessed by the thread 0 into the dedicated memory area 303#0. The CPU #0 stores data commonly accessed by the threads 0 and 1 into the shared memory area 103.

The multi-core processor system 100 has access to a storage area that stores an arrival count M. The arrival count M may be defined as the number of CPUs arriving at the synchronous point among the synchronization-object CPUs or may be defined as the number of CPUs arriving at the synchronous point among the CPUs to be synchronized. In the case of the former definition, the multi-core processor system 100 counts the arrival count M including the synchronous master CPU, whereas in the case of the latter definition, the multi-core processor system 100 counts the arrival count M excluding the synchronous master CPU. In the description of this embodiment, the latter definition is used as the definition of the arrival count M.

The synchronization processing unit 310 is a function included in the synchronous master CPU that is a sender of the synchronization processing. The synchronous signal receiving units 311 and 312 are functions included in the CPUs to be synchronized that are recipients of the synchronization processing. The synchronous signal receiving unit 311 operates when the synchronized thread arrives at the synchronous point. The synchronous signal receiving unit 312 operates when a ready signal is received from the CPUs to be synchronized.

The registering unit 321 has a function of registering the CPUs that are to be synchronized and the number of the CPUs into the synchronization information table 302, based on a synchronous command issued from a first CPU. For example, the registering unit 321 registers the CPUs #0, #1, and #2 and a CPU count of 3 into the synchronization information table 302. The registering unit 321 may register the number of the CPUs to be synchronized into the synchronization information table 302. In the case of FIG. 3, the registering unit 321 registers the number of CPUs to be synchronized "2" into the synchronization information 302. Since this embodiment assumes that the definition of the arrival count M is a count that excludes the synchronous master CPU, description will be given of an example where the number of the CPUs to be synchronized is registered in the synchronization information table 302.

The registering unit 321 may perform registration into the synchronization information table 302, based on the process table 301 indicating relationships between the processes and the CPUs. Information of the registration may be stored in the register, the cache memory, the RAM 203, etc. of the CPU #0.

The transmitting unit 322 transmits the synchronous signal and the arrival count for the synchronous point to other CPUs excluding the first CPU among the CPUs. For example, the transmitting unit 322 transmits to the CPUs #1 and #2, the synchronous signal and a point on the RAM 203 where the arrival count M=0 is stored. Information of the transmission may be stored in the register, the cache memory, the RAM 203, etc. of the CPU #0.

The receiving unit 323 receives a signal that is a response to the synchronous signal, from other CPUs excluding the first CPU among the plural CPUs. For example, the receiving unit 323 receives from the CPUs #1 and #2, a ready signal that is a response to the synchronous signal. The ready signal may be the same signal as the synchronous signal. The result of the reception may be stored in the register, the cache memory, the RAM 203, etc. of the CPU #0.

The notifying unit 324 has a function of notifying a thread executed by the first CPU of a completion of the synchronization processing upon receiving a signal that is a response to the synchronous signal, from all of other CPUs excluding the first CPU among the plural CPUs. For example, the notifying unit 324 notifies the thread 0 of the completion of the synchronization processing upon receiving a ready signal from the CPUs #1 and #2. Information of the notification may be stored in the register, the cache memory, the RAM 203, etc. of the CPU #0.

The receiving unit 331 has a function of receiving a synchronous signal that is based on a synchronous command. For example, the receiving unit 331 receives a synchronous signal transmitted from the transmitting unit 322. The result of the reception may be stored in the register, the cache memory, the RAM 203, etc. of the CPU #1.

The counting unit 332 has a function of counting the arrival count for the synchronous point based on the synchronous signal. For example, the counting unit 332 counts the arrival count M for the synchronous point. The result of the counting may be stored in the register, the cache memory, the RAM 203, etc. of the CPU #1.

The comparing unit 333 has a function of comparing the arrival count for the synchronous point with a predetermined value when the arrival count is counted by the counting unit 332. The predetermined value N is the number of CPUs synchronized based on the synchronous command and may be, for example, N=3 based on the CPUs #0 to #2. The predetermined value N may be the number of the CPUs to be synchronized. In this case, the predetermined value N is N=2. For example, the comparing unit 333 compares the arrival count M with the predetermined value N. The result of the comparison is stored in the register, the cache memory, the RAM 203, etc. of the CPU #1.

The creating unit 334 has a function of duplicating a first shared memory area based on the arrival count for the synchronous point, if the result of the comparison by the comparing unit 333 indicates non-coincidence, to create a second shared memory area. The first shared memory area stores data commonly accessed by threads executed by CPUs among the plural CPUs. For example, the creating unit 334 duplicates the shared memory area 103 to create a duplicated shared memory area 104#1_1.

The creating unit 334 may create a third shared memory area that is a duplicate of the first shared memory area. For example, the creating unit 334 duplicates the shared memory area 103 to create a duplicated shared memory area 104#1_2. Information of the creation of the duplicated shared memory area 104 may be stored in the register, the cache memory, the RAM 203, etc. of the CPU #1.

The setting unit 335 has a function of setting the access destination of a thread executed by a CPU arriving at the synchronous point, from data in the first shared memory area to data in the second shared memory area created by the creating unit 334, if the result of the comparison by the comparing unit 333 indicates non-coincidence. For example, the setting unit 335 sets the access destination of the thread 1 from data stored in the shared memory area 103 to data stored in the duplicated shared memory area 104#1_1. Information of the setting may be stored in the register, the cache memory, the RAM 203, etc. of the CPU #1.

The switching unit 336 has a function of switching between the execution of the synchronous signal receiving unit 311 and the execution of the synchronous signal receiving unit 312, if the result of the comparison by the comparing unit 333 indicates non-coincidence. For example, if the result of the comparison by the comparing unit 333 indicates non-coincidence, the switching unit 336 deactivates invocation of the synchronous signal receiving unit 311 in response to the synchronous signal and activates invocation of the synchronous signal receiving unit 312 in response to the ready signal. Information of the switching may be stored in the register, the cache memory, the RAM 203, etc. of the CPU #1.

The transmitting unit 337 has a function of transmitting to plural CPUs, the ready signal corresponding to the synchronous signal and the arrival count for the synchronous point. For example, the transmitting unit 337 transmits the ready signal and the arrival count M to the CPUs #0 and #2. Information of the transmission may be stored in the register, the cache memory, the RAM 203, etc. of the CPU #1.

The notifying unit 338 has a function of issuing to a thread executing the processing, an instruction for speculative execution of processing after the receipt of the synchronous signal, if the result of the comparison by the comparing unit 333 indicates non-coincidence. The notifying unit 338 has a function of issuing to a thread executing the processing, an instruction to execute processing after the reception of the synchronous signal, if the result of the comparison by the comparing unit 333 indicates coincidence. For example, if the result of the comparison by the comparing unit 333 indicates non-coincidence, the notifying unit 338 issues an instruction for speculative execution to the thread 1. If the result of the comparison by the comparing unit 333 indicates coincidence, the notifying unit 338 issues an instruction to execute the processing. Information of the notification may be stored in the register, the cache memory, the RAM 203, etc. of the CPU #1.

The receiving unit 341 has a function of receiving the ready signal and the arrival count for the synchronous point, transmitted from the transmitting unit 337. For example, the receiving unit 341 receives the ready signal and the arrival count M transmitted from the CPU #2. The reception result may be stored in the register, the cache memory, the RAM 203, etc. of the CPU #1.

The comparing unit 342 has a function of comparing the arrival count for the synchronous point with a predetermined value when the ready signal and the arrival count at the synchronous point are received by the receiving unit 341. For example, the comparing unit 342 compares the arrival count M with the predetermined value N. The comparison result is stored in the register, the cache memory, the RAM 203, etc. of the CPU #1.

The switching unit 343 has a function of switching between the execution of the synchronous signal receiving unit 311 and the execution of the synchronous signal receiving unit 312, if the result of comparison by the comparing unit 342 indicates coincidence. For example, if the result of comparison by the comparing unit 342 indicates coincidence, the switching unit 343 activates invocation of the synchronous signal receiving unit 311 in response to the synchronous signal and deactivates invocation of the synchronous signal receiving unit 312 in response to the ready signal. Information of the switching may be stored in the register, the cache memory, the RAM 203, etc. of the CPU #1.

The comparing unit 344 has a function of comparing data in the first shared memory area with data in the second shared memory area, if the result of comparison by the comparing unit 342 indicates coincidence. For example, the comparing unit 344 compares data stored in the shared memory area 103 with data stored in the duplicated shared memory area 104#1_1. The comparing unit 344 may compare data in the second shared memory area with data in a third shared memory data. For example, the comparing unit 344 compares data stored in the duplicated shared memory area 104#1_1 with data stored in a duplicated shared memory area 104#1_2. The comparison result is stored in the register, the cache memory, the RAM 203, etc. of the CPU #1.

The notifying unit 345 has a function of issuing, based on the result of comparison by the comparing unit 344, an instruction to continue or interrupt the processing executed after the reception of the synchronous signal. For example, upon a comparison result indicating coincidence, the notifying unit 345 issues to the thread 1, an instruction to continue the processing after the comparison. Upon a comparison result indicating non-coincidence, the notifying unit 345 issues to the thread 1, an instruction to interrupt the processing executed after the reception of the synchronous signal. Information of the notification is stored in the register, the cache memory, the RAM 203, etc. of the CPU #1.

In this manner, the multi-core processor system 100 allows a synchronous signal issued from a specific core among plural cores to be received by another core other than the specific core among the plural cores. Subsequently, when the reception of the synchronous signal is completed with the arrival at the synchronous point, the multi-core processor system 100 transmits a ready signal corresponding to the synchronous signal and the number of cores arriving at the synchronous point to plural cores. When the transmitted ready signal and the number of cores arriving at the synchronous point are received by other cores, the multi-core processor system 100 compares the number of the other cores with the number of cores arriving at the synchronous point by each of cores arriving at the synchronous point.

If the result of a first comparison as a comparison of the number of cores indicates non-coincidence, the multi-core processor system 100 duplicates, for each of the cores arriving at the synchronous point, duplication-source data commonly accessed from threads executed by plural cores. If the first comparison result indicates non-coincidence, the multi-core processor system 100 sets the access destination of threads executed by cores arriving at the synchronous point to duplicate data that is duplicated from the duplication-source data. If the first comparison result indicates coincidence, in the multi-core processor system 100, the cores arriving at the synchronous point compare the duplication-source data with the duplicate data.

If the first comparison result indicates non-coincidence, in the multi-core processor system 100, the cores arriving at the synchronous point send an instruction for speculative execution of threads to the threads. If the result of a second data comparison indicates coincidence, in the multi-core processor system 100, the cores arriving at the synchronous point send to the threads, an instruction to continue the speculative execution of threads. If the second comparison result indicates non-coincidence, the multi-core processor system 100 sends an instruction to re-execute threads from cores arriving at the synchronous point to the threads.

FIG. 4 is an explanatory view of an example of the contents of the process table 301. The process table 301 includes four fields, i.e., a PID field, a PPID field, a PGID field, and a CPU No. field. The PID field stores a process ID (PID) that is an identifier that uniquely identifies a process or a thread. In the following description, the thread will be described. In the following description of the process table 301, a given thread is a thread stored in the PID field.

The PPID field stores a parent PID (PPID) that is a PID of a parent thread of the given thread. The PGID stores a process group ID (PGID) that is the No. of a thread group that includes the given thread. This embodiment assumes that the thread is a parent thread in a thread group when the PID and the PGID are the same. The CPU No. field stores the CPU No. of the CPU to which the given thread is allocated.

For example, a thread of PID=1001 belongs to a thread group of PGID=1001 and is allocated to CPU #1. Hereinafter, a thread of PID=x is referred to as a "thread x". Since PID=PGID=1001, a thread 1001 is a parent thread in a thread group of PGID=1001. The thread 1001 is set at PPID=1. If the OS running in the multi-core processor system 100 is UNIX (registered trademark), the thread 1 is an init process.

A thread 1002 belongs to the thread group of PGID=1001 and is allocated to a CPU #4. The thread 1002 is a child thread as indicated by PPID=1001. Similarly, threads 1003, 1004, and 1005 belong to the thread group of PGID=1001 and are child threads of the thread 1001. The threads 1003, 1004, and 1005 are allocated to CPUs #5, #6, and #8, respectively.

Since PID=PGID=1006, a thread 1006 is a parent thread of a thread group PGID=1006. The thread 1006 is allocated to a CPU #0. A thread 1007 belongs to the thread group PGID=1006 and is allocated to a CPU #2. The thread 1007 is a child thread of the thread 1006 due to PPID=1006.

FIG. 5 is an explanatory view of an example of the contents of the synchronization information table 302. The synchronization information table includes two fields, i.e., a number-of-CPUs to be synchronized field and a synchronization-object CPU field. The number-of-CPUs-to-be-synchronized field stores the sum of the CPUs to be synchronized. The synchronization-object CPU field stores the CPU Nos. of the synchronization-object CPUs. The example depicted in FIG. 5 stores, as a record, 4 as the number of the CPUs to be synchronized and the CPUs #1, #4, #5, #6, and #8 as the synchronization-object CPUs.

Figure 6:
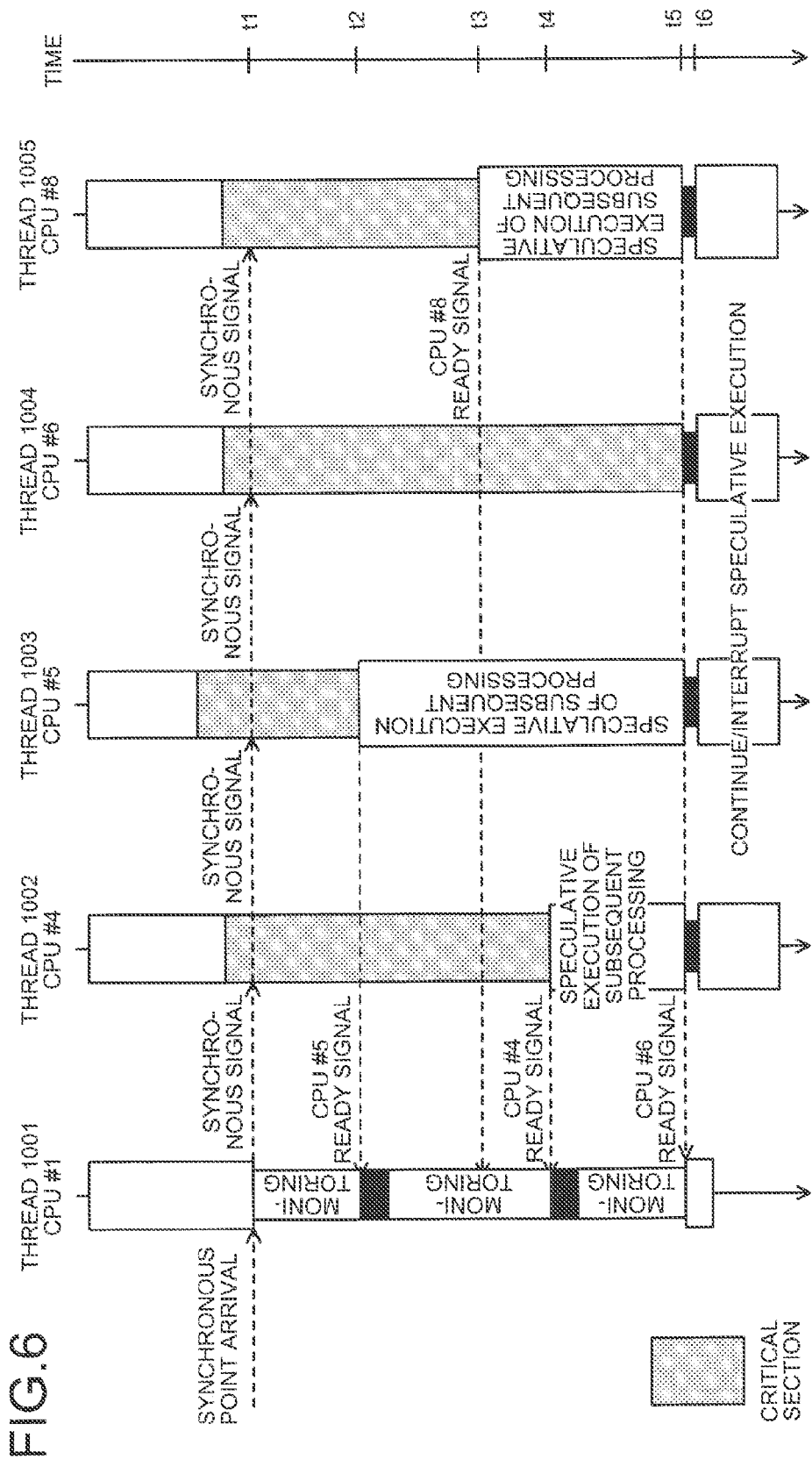
FIG. 6 is an explanatory view of an example of synchronization processing operations of the multi-core processor system 100.

FIG. 6 is an explanatory view of an example of synchronization processing operations of the multi-core processor system 100. FIG. 6 depicts an operation example where the CPU #1 acting as the synchronous master CPU starts the synchronization, with the CPUs #4, #5, #6, and #8 as the CPUs to be synchronized and executing the synchronization processing. The CPU #1 executes the thread 1001 depicted in FIG. 4 and the CPUs #4, #5, #6, and #8 execute the threads 1002, 1003, 1004, and 1005, respectively.

When the CPU #1 arrives at the synchronous point at time t1, the CPU #1 creates a record of the synchronization information table 302 from the process table 301. For example, the CPU #1 extracts the threads 1001 to 1005 included in the group to which the thread 1001 executed by the CPU #1 belongs. After the extraction, the CPU #1 registers N=4 that is the number of CPUs executing the threads 1002 to 1005, into the number-of-CPUs-to-be-synchronized field of a new record of the synchronization information table 302. The CPU #1 registers #1, #4, #5, #6, and #8, which are the Nos. of the CPUs executing the threads 1001 to 1005, into the synchronization-object CPU field of the new record.

After the registration, the CPU #1 refers to the synchronization information table 302 to send a synchronous signal to the synchronization-object CPUs. However, the CPUs #4, #5, #6, and #8 are in critical sections and therefore cannot receive the synchronous signal. After the sending of the synchronous signal, the CPU #1 monitors the ready signal from the CPUs to be synchronized. The CPU #1 may execute another thread having no relationship with the thread 1001.

Subsequently, when the CPU #5 completes the critical section and arrives at the synchronous point at time t2, the CPU #5 performs a broadcast transmission of the ready signal, for the speculative execution of the subsequent processing of the thread 1003. Similarly, when the CPU #8 completes the critical section and arrives at the synchronous point at time t3, the CPU #8 performs a broadcast transmission of the ready signal, for the speculative execution of the subsequent processing of the thread 1005. When the CPU #4 completes the critical section and arrives at the synchronous point at time t4, the CPU #4 performs a broadcast transmission of the ready signal, for the speculative execution of the subsequent processing of the thread 1002.

Finally, when the CPU #6 completes the critical section and arrives at the synchronous point at time t5, the CPU #6 performs a broadcast transmission of the ready signal. The CPUs #4, #5, and #8 detecting the arrival of all the CPUs at the synchronous point determine at time t6 whether to continue or interrupt the speculative execution. The statuses of the multi-core processor system 100 at times t1, t2, t3, t5, and t6 are depicted in FIGS. 7, 8, 9, 10, and 11, respectively. The status of the multi-core processor system 100 at time t4 does not vary much from time t3 and therefore is not depicted.

Figure 7:
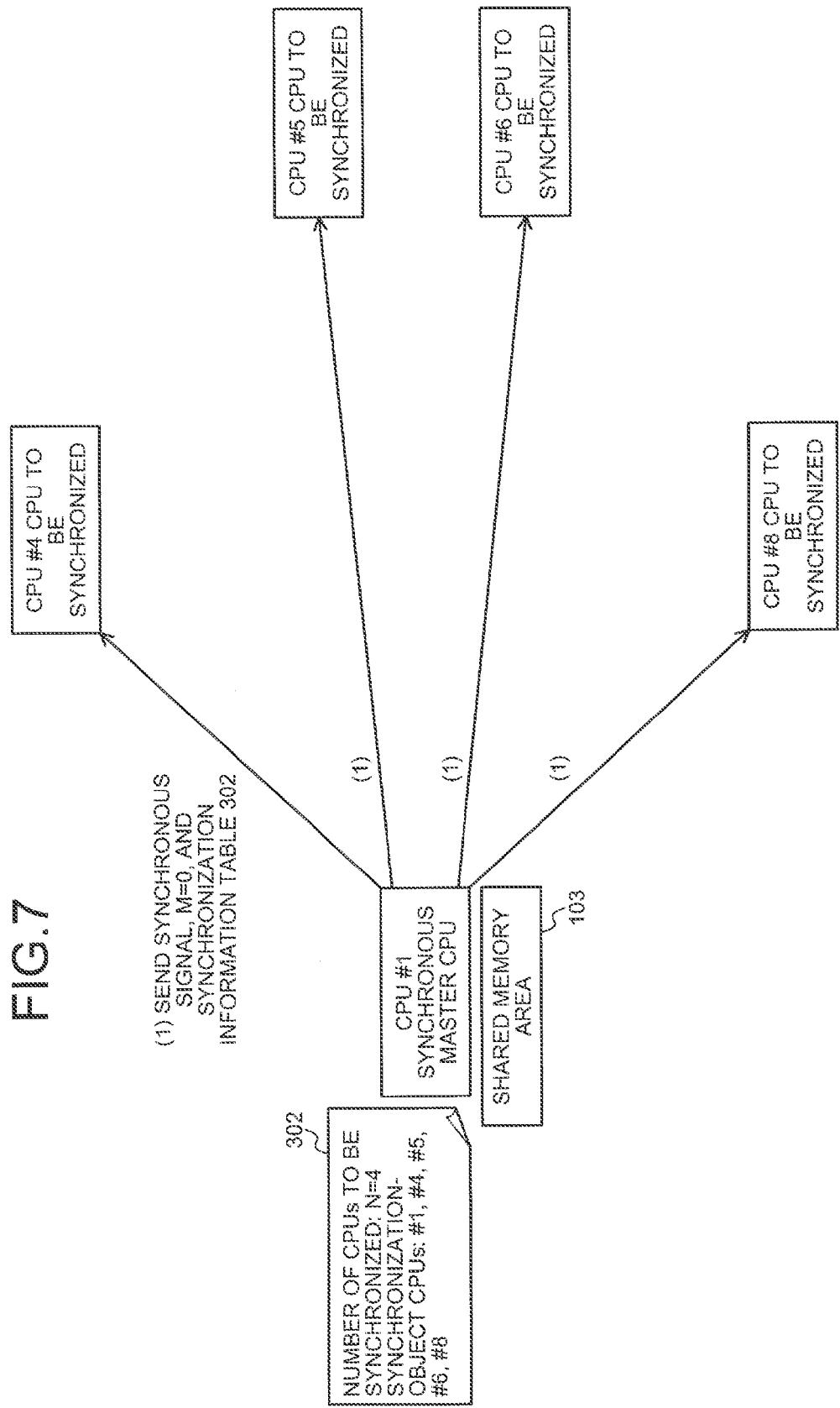
FIG. 7 is an explanatory view of the status of the multi-core processor system 100 at time t1 in FIG. 6.

FIG. 7 is an explanatory view of the status of the multi-core processor system 100 at time t1 in FIG. 6. The CPU #1 arriving at the synchronous point sends, as processing (1), a synchronous signal to the CPUs #4, #5, #6, and #8, excluding the CPU #1 among the synchronization-object CPUs. Concurrent with the sending of the synchronous signal, the CPU #1 issues M=0 as the arrival count M indicating the number of CPUs that have arrived at the synchronous point among the CPUs to be synchronized and issues the synchronization information table 302. For example, since the arrival count M and the synchronization information table 302 are stored in the memory 101 commonly accessible by the CPUs 201, the CPU #1 may give notification of addresses at which the arrival count M and the synchronization information table 302 are stored.

Figure 8:
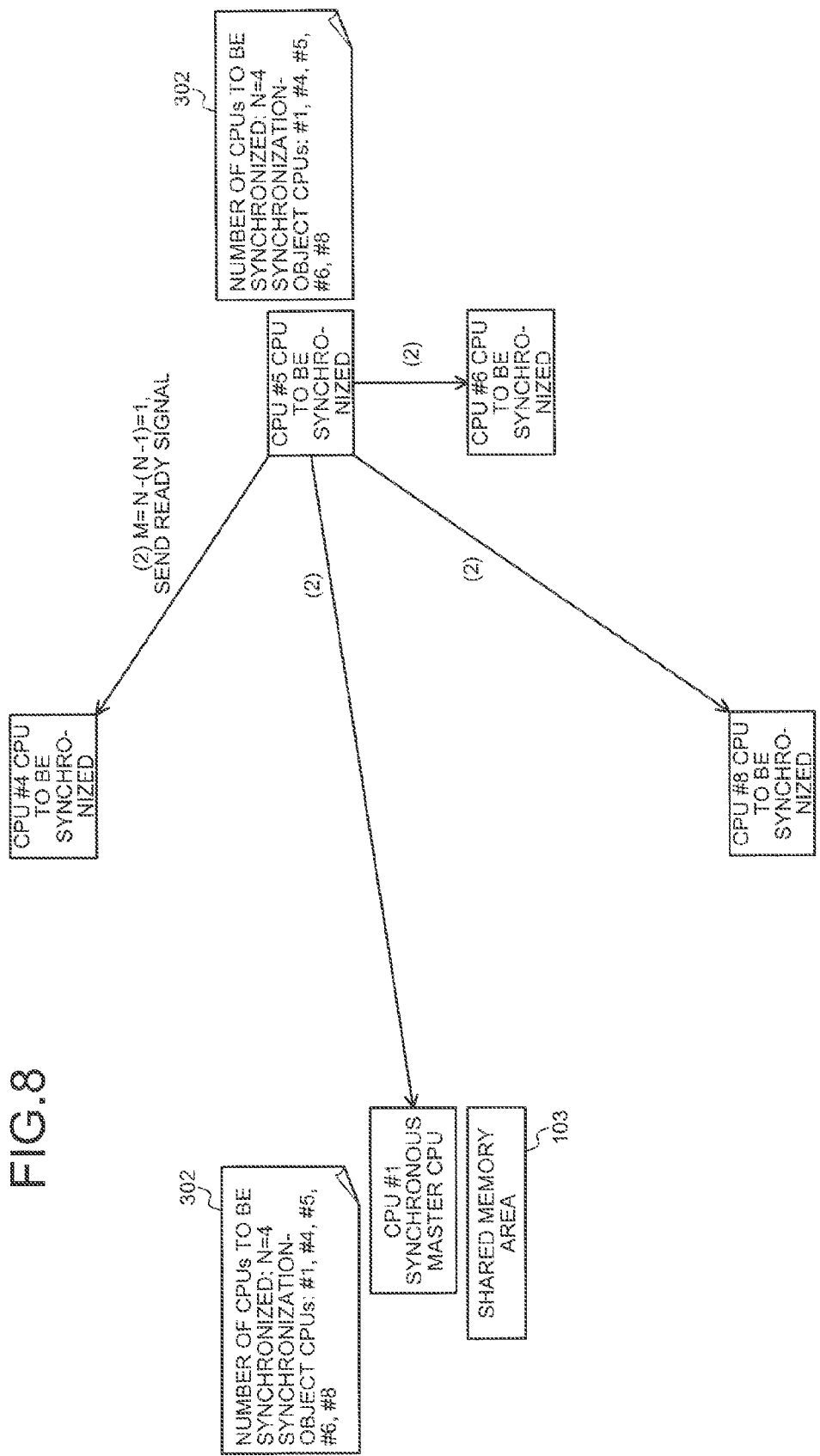
FIG. 8 is an explanatory view of the status of the multi-core processor system 100 at time 2 in FIG. 6.

FIG. 8 is an explanatory view of the status of the multi-core processor system 100 at time 2 in FIG. 6. The CPU #5 arriving at the synchronous point at time t2 increments, as processing (2), the value of the arrival count M with M=N−(N−1)=1. The CPU #5 sends M=1 and the ready signal to the CPUs #1, #4, #6, and #8, excluding the CPU #5 among the synchronization-object CPUs. From M<N, the CPU #5 determines the presence of a CPU to be synchronized that has not yet reached the synchronous point, and speculatively executes the subsequent processing of the thread 1003. The speculative execution operations will be described with reference to FIG. 9.

Concerning the incrementing of the arrival count M, even if issuances are made at the same timing, a single CPU alone can alter the original entity numeral of a pointer variable at one time. Since the incrementing of the arrival count M is implemented by logic in the form of an increment command, ensured one-by-one incrementing is performed even if access is made simultaneously.

Figure 9:
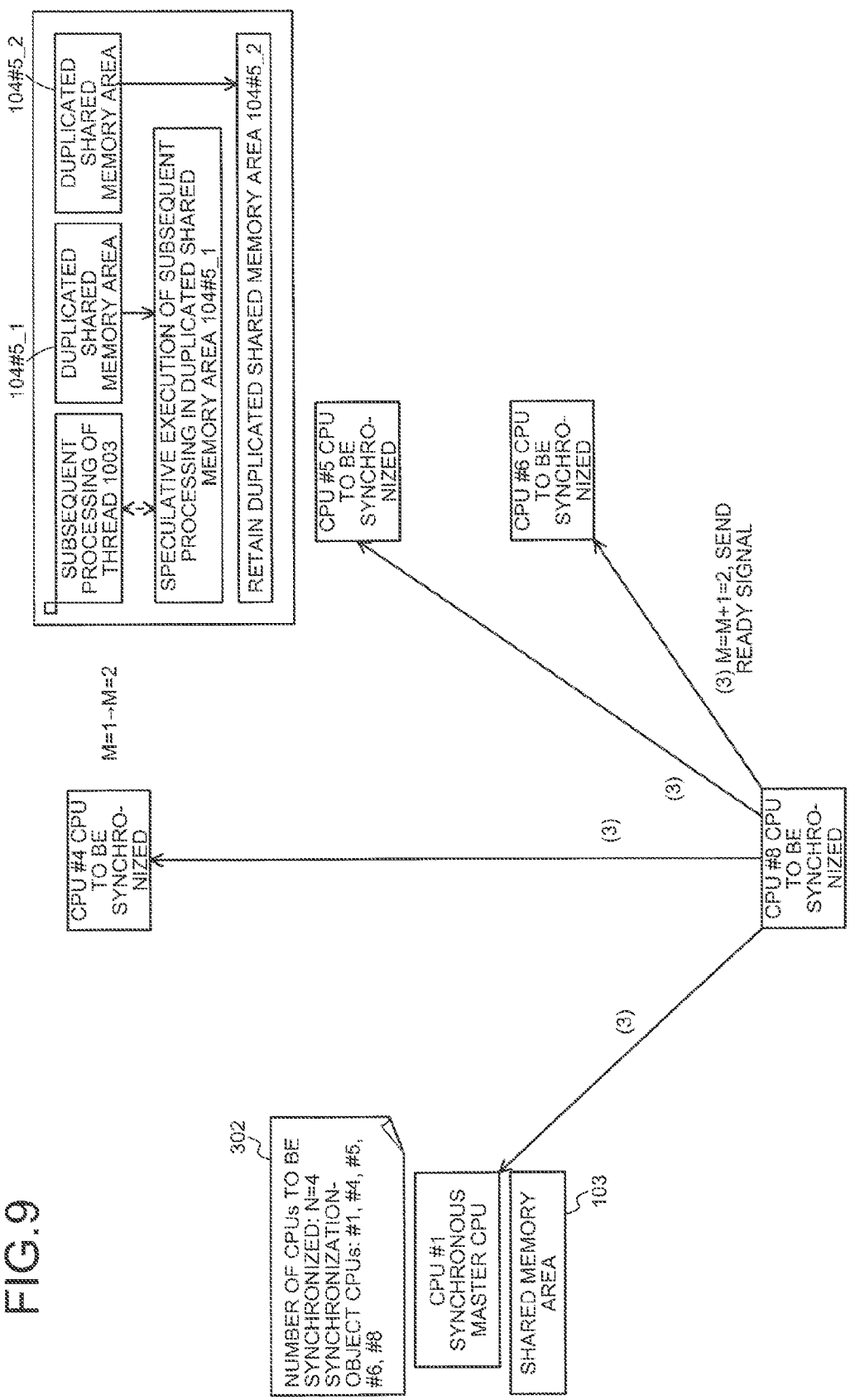
FIG. 9 is an explanatory view of the status of the multi-core processor system 100 at time t3 in FIG. 6.

FIG. 9 is an explanatory view of the status of the multi-core processor system 100 at time t3 in FIG. 6. The CPU #8 arriving at the synchronous point at time t3 increments, as processing (3), the value of the arrival count M to M=M+1=2. The CPU #8 sends M=2 and the ready signal to the CPUs #1, #4, #5, and #6, excluding the CPU #8 among the synchronization-object CPUs. From M<N, the CPU #8 determines the presence of a CPU to be synchronized that has not yet reached the synchronous point and speculatively executes the subsequent processing of the thread 1005.

The CPU #5 arriving at the synchronous point at time t2 speculatively executes the subsequent processing of the thread 1003. For example, the CPU #5 creates a duplicated shared memory area 104#5_1 and a duplicated shared memory area 104#5_2, duplicated from the shared memory area 103. After the creation, the CPU #5 accesses the duplicated shared memory area 104#5_1 to speculatively execute the subsequent processing of the thread 1003. The duplicated shared memory area 104#5_2 is not accessed from the thread 1003. Therefore, data stored in the duplicated shared memory area 104#5_2 is retained without being altered until the completion of the synchronization processing.

Although not depicted, the CPU #4 arriving at the synchronous point at time t4 increments, as processing (4), the value of the arrival count M to M=M+1=3. The CPU #4 sends M=3 and the ready signal to the CPUs #1, #5, #6, and #8, excluding the CPU #4 among the synchronization-object CPUs. From M<N, the CPU #4 determines the presence of a CPU to be synchronized that has not yet reached the synchronous point and speculatively executes the subsequent processing of the thread 1002.

Figure 10:
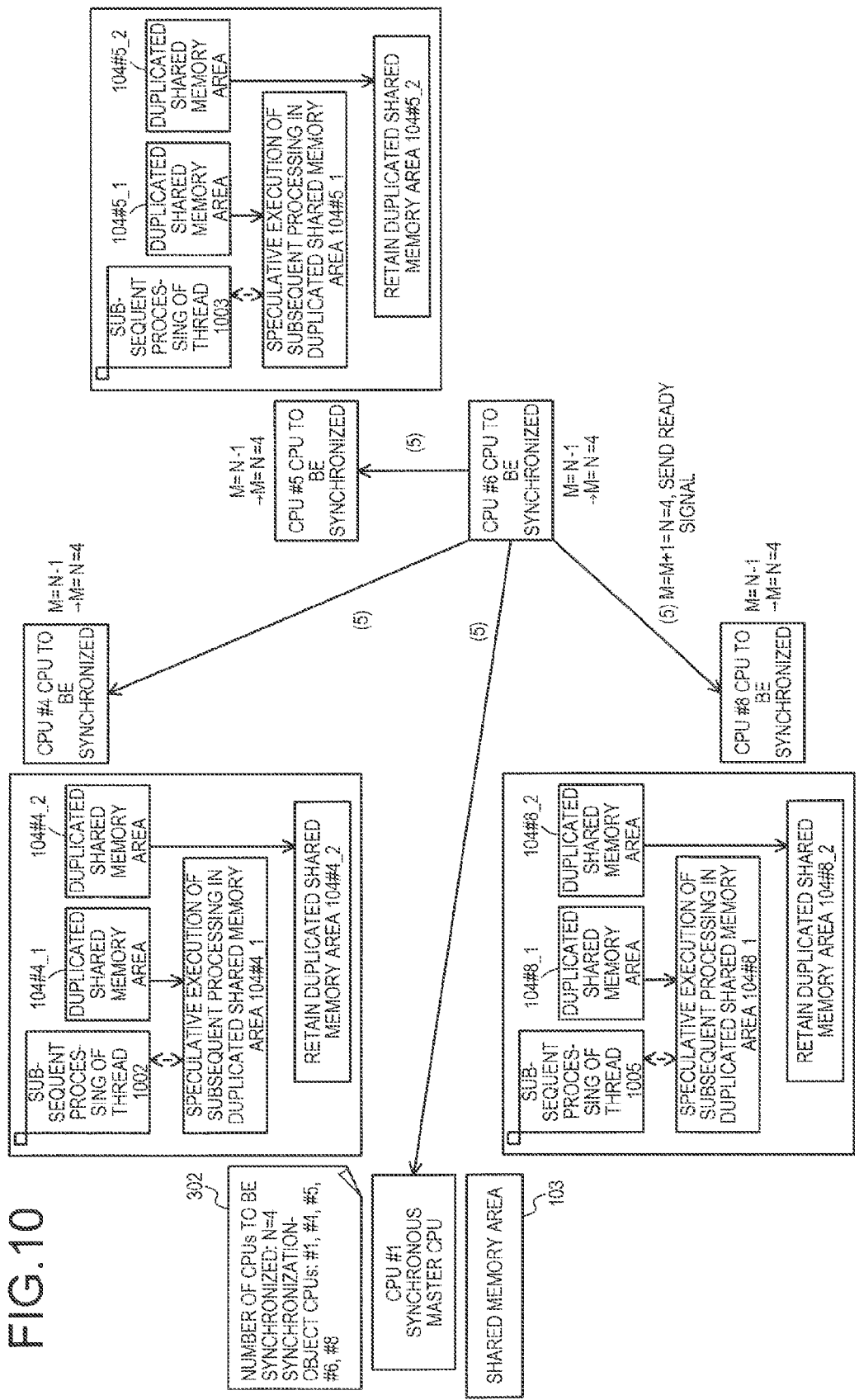
FIG. 10 is an explanatory view of the status of the multi-core processor system 100 at time t5 in FIG. 6.

FIG. 10 is an explanatory view of the status of the multi-core processor system 100 at time t5 in FIG. 6. The CPU #6 arriving at the synchronous point at time t5 increments, as processing (5), the value of the arrival count M to M=M+1=4. The CPU #6 sends M=4 and the ready signal to the CPUs #1, #4, #5, and #8, excluding the CPU #6 among the synchronization-object CPUs. From M=N=4, the CPU #6 determines the arrival of all of the CPUs that are to be synchronized and executes the subsequent processing of the thread 1004.

At time t5, the CPU #5 arriving at the synchronous point at time t2 is in speculative execution of the subsequent processing of the thread 1003. Similarly, the CPU #8 arriving at the synchronous point at time t3 speculatively executes the subsequent processing of the thread 1005, while the CPU #4 arriving at the synchronous point at time t4 speculatively executes the subsequent processing of the thread 1002. When receiving the ready signal, the CPUs #4, #5, and #8 determine whether the speculative execution is successful or has failed by comparing data of the duplicated shared memory area 104. A specific determination method will be described with reference to FIG. 11.

Figure 11:
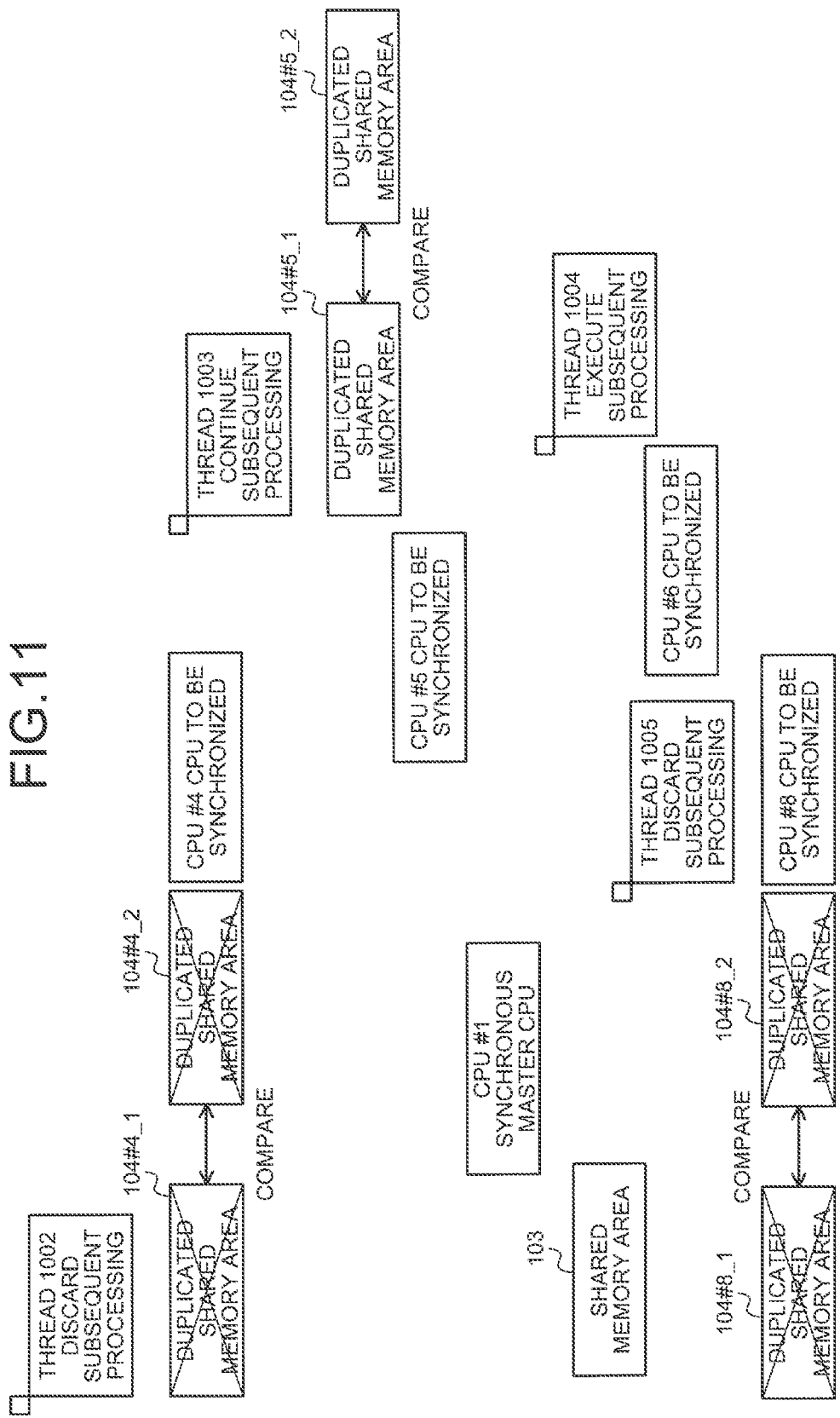
FIG. 11 is an explanatory view of the status of the multi-core processor system 100 at time t6 in FIG. 6.

FIG. 11 is an explanatory view of the status of the multi-core processor system 100 at time t6 in FIG. 6. The CPUs #4, #5, and #8 receiving the ready signal at time t6 determine whether data of two duplicated shared memory areas 104 coincide with each other. For example, the CPU #4 compares data of a duplicated shared memory area 104#4_1 with data of a duplicated shared memory area 104#4_2.

FIG. 11 assumes a state where data of the duplicated shared memory area 104#4_1 does not coincide with data of the duplicated shared memory area 104#4_2. If the data do not coincide, the speculative execution of the thread 1002 changes data of the shared memory area 103. This means that the speculative execution is actually not possible and thus, the CPU #4 interrupts the speculative execution and re-executes the subsequent processing. Similarly, data of a duplicated shared memory area 104#8_1 and data of a duplicated shared memory area 104#8_2 do not coincide and consequently, the CPU #8 interrupts the speculative execution, discards the result of the speculative execution, and re-executes the subsequent processing.

The CPU #5 compares data of a duplicated shared memory area 104#5_1 with data of a duplicated shared memory area 104#5_2. FIG. 11 assumes a state where data of the duplicated shared memory area 104#5_1 and data of the duplicated shared memory area 104#5_2 coincide. If the data coincide, the speculative execution of the thread 1003 is completed at a read/write process of a dedicated memory area of the CPU #5 and is a redundant synchronization process with no change in data of the shared memory area. Accordingly, the CPU #5 continues the speculative execution.

Data of the shared memory area 103 may change consequent to processing other than the synchronization processing by the synchronous master CPU or by CPUs other than the synchronization-object CPUs. Such situations include a case in which data is intentionally or errantly changed by processing at the other synchronization-object CPUs and a case in which data is changed by other CPUs that should have been included among the synchronization-object CPUs. Such operations may occur even in the case of the multi-core processor system 100 according to the conventional example.

For example, a case is assumed in which the multi-core processor system 100 according to this embodiment determines success or failure of the speculative execution from the comparison of a duplicated shared memory area 104#x_1 and the shared memory area 103. x is the No. of the CPU making the speculative execution. In this case, if data has changed in completely the same manner, success may be determined even if the speculative execution has failed. In this manner, the comparison of data between the duplicated shared memory area 104#x_1 and the shared memory area 103 may hide the failure. Accordingly, the multi-core processor system 100 determines whether the speculative execution is successful or has failed using data of the duplicated shared memory area 104 without using data of the shared memory area 103.

If a CPU #x continues the speculative execution, the multi-core processor system 100 switches the data access destination for the speculative execution from the duplicated shared memory area 104#x_1 to the shared memory area 103. In this case, if data of the duplicated shared memory area 104#x_1 does not coincide with data of the shared memory area 103, the multi-core processor system 100 may issue a memory error, etc. by a function of the OS.

If data of the shared memory area 103 may be assumed to not be rewritten by the synchronous master CPU, configuration may be such that the multi-core processor system 100 creates only the duplicated shared memory area 104#x_1. In this case, the CPU #x compares the shared memory area 103 with the duplicated shared memory area 104x_1 to determine whether the speculative execution is successful, thereby enabling the number of the duplicated shared memory areas 104 to be created to be limited to one, achieving high-speed processing.

Figure 12:
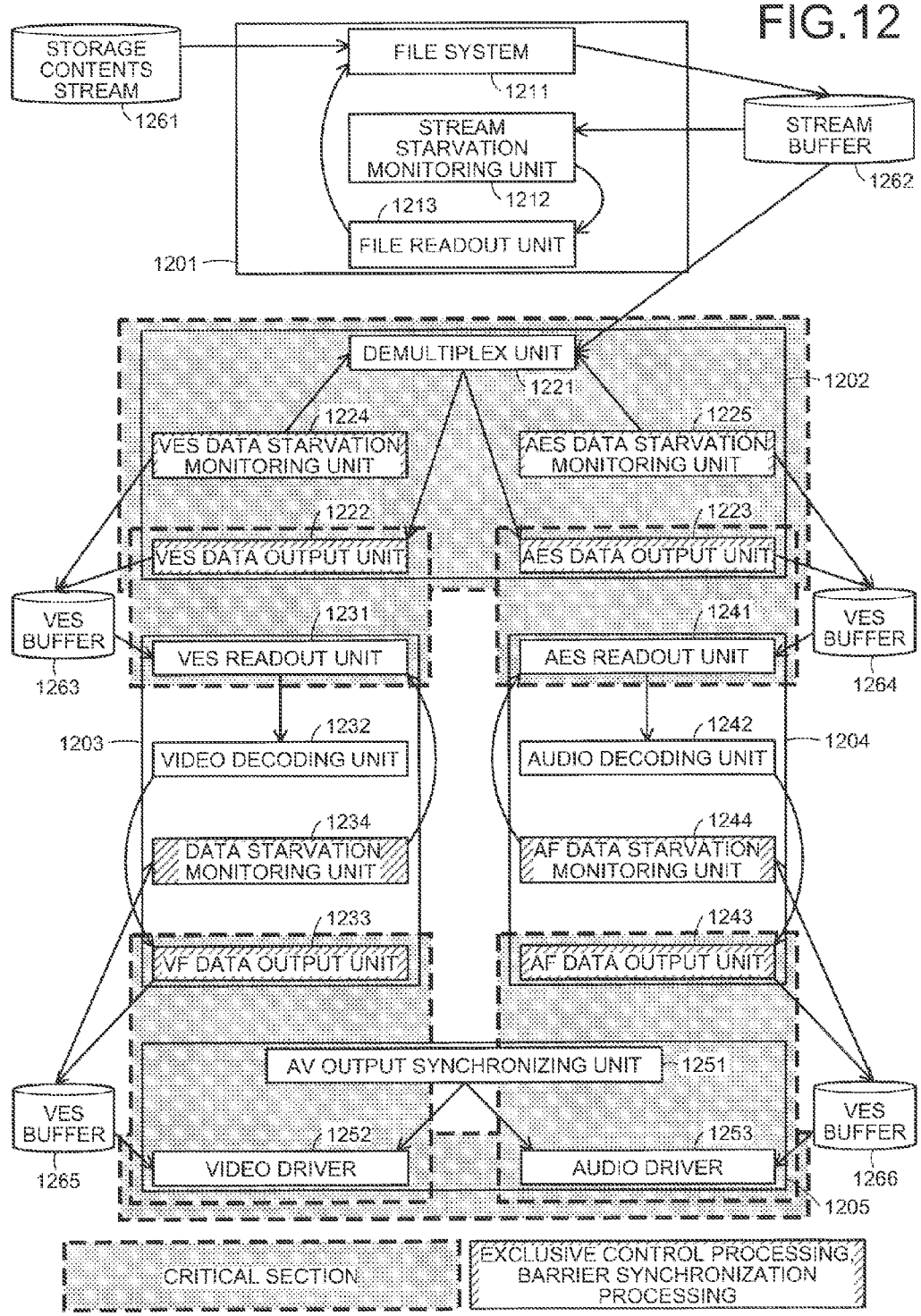
FIG. 12 is an explanatory view of an example of an application to a video replay application.

FIG. 12 is an explanatory view of an example of an application to a video replay application. FIG. 12 depicts a block diagram of a group of processes of the video replay application and shows, among the processes, portions performing exclusive control processing, barrier synchronization processing and critical section processing.

The video replay application includes a stream data readout thread 1201, a demultiplex thread 1202, a video thread 1203, an audio thread 1204, and an AV output thread 1205.

The stream data readout thread 1201 has a function of reading out a stream. For example, the stream-data readout thread 1201 makes use of a file system 1211 as a function of the OS, to read in video data from a storage contents stream 1261, for the storage into a stream buffer 1262. The stream data readout thread 1201 detects that the stream buffer 1262 is starving, by a stream starvation monitoring unit 1212. If a starvation is detected, the stream-data readout thread 1201 writes new video data from the file system 1211 into the stream buffer 1262, by a file readout unit 1213.

The demultiplex thread 1202 has a function of dividing the read-out stream into video data and audio data. For example, the demultiplex thread 1202 reads in video data from the stream buffer 1262 and, by a demultiplex unit 1221, separates the video data into video elementary stream (VES) data and audio elementary stream (AES) data. After the separation, the demultiplex thread 1202 stores the VES data into a VES buffer 1263 by a VES data output unit 1222 and stores the AES data into an AES buffer 1264 by an AES data output unit 1223.

If the VES buffer 1263 is starving, the demultiplex thread 1202 sends a request for separation to the demultiplex unit 1221 by a VES data starvation monitoring unit 1224. Similarly, if the AES buffer 1264 is starving, the demultiplex thread 1202 sends a request for separation to the demultiplex unit 1221 by an AES data starvation monitoring unit 1225.

The video thread 1203 has a function of performing video processing. For example, the video thread 1203 reads out VES data by a VES readout unit 1231 and decodes the VES data by a video decoding unit 1232 to create video frame (VF) data. After the creation, the video thread 1203 stores the VF data into a VF buffer 1265 by a VF data output unit 1233. If the VF buffer 1265 is starving, the video thread 1203 sends a request for readout to the VES readout unit 1231 by a VF data starvation monitoring unit 1234.

The audio thread 1204 has a function of performing audio processing. For example, the audio thread 1204 reads out AES data by an AES readout unit 1241 and decodes the AES data by an audio decoding unit 1242 to create audio frame (AF) data. After the creation, the audio thread 1204 stores the AF data into an AF buffer 1266 by an AF data output unit 1243. If the AF buffer 1266 is starving, the audio thread 1204 sends a request for readout to the AES readout unit 1241 by an AF data starvation monitoring unit 1244.

The AV output thread 1205 has a function of synchronizing and displaying the decoded video data and audio data. For example, the AV output thread 1205 synchronizes a video driver 1252 and an audio driver 1253 by an AV output synchronizing unit 1251 to output video data. The video driver 1252 reads out the VF data from the VF buffer 1265 and outputs the VF data to the display 207. The audio driver 1253 reads out the AF data from the AF buffer 1266 and outputs the AF data to a speaker, etc. connected to the I/F 208.

Since in this manner the stream data readout thread 1201 to the AV output thread 1205 perform respective independent processing, the stream data readout thread 1201 to the AV output thread 1205 may appear to be very suitable for the parallel processing. However, due to the interlocking operations of the demultiplex thread 1202 to the AV output thread 1205 with the VES buffer 1263 to the AF buffer 1266, the exclusive control processing and the barrier synchronization processing are inserted to facilitate design.

An example of the insertion of the exclusive control processing is as follows. For example, the VES data output unit 1222 and the VES readout unit 1231 make common access to the VES buffer 1263 and therefore, the exclusive control processing is inserted in the VES data output unit 1222 and the VES readout unit 1231 to prevent concurrent access. Like cases occur between the AES data output unit 1223 and the AES readout unit 1241, between the VF data output unit 1233 and the video driver 1252, and between the AF data output unit 1243 and the audio driver 1253.

To prevent the overwrite to the VES buffer 1263, the processing of the VES data output unit 1222 may be set as the critical section by the developer. The same will also occur in the case of the AES data output unit 1223, the VF data output unit 1233, and the AF data output unit 1243.

The VES data starvation monitoring unit 1224 refers, as a method of monitoring the starvation, to the write position and the read position of the VES buffer 1263 for example. To prevent the alteration of the write position and the read position during the monitoring, the processing of the VES data starvation monitoring unit 1224 may be set as the critical section by the developer. The same will apply to the AES data starvation monitoring unit 1225, the VF data starvation monitoring unit 1234, and the AF data starvation monitoring unit 1244.

To prevent the VES data output unit 1222 from starting the execution before the completion of the separation by the demultiplex unit 1221, the barrier synchronization processing may be inserted. To prevent the VES data starvation monitoring unit 1224 from starting the execution while the VES data output unit 1222 is in execution, the barrier synchronization processing may be inserted. The same will apply to the demultiplex unit 1221, the AES data output unit 1223, and the AES data starvation monitoring unit 1225. The AV output synchronizing unit 1251 synchronizes the video driver 1252 and the audio driver 1253 by one frame and thus, the barrier synchronization processing may be inserted therein.

When such an video replay application capable of setting various exclusive control processes and barrier synchronization processes is designed for the single-core processor system, a simple exclusive flag may be used to perform read/write while switching one buffer. In the single-core processor system, the CPU resources are utilized without exception by the operation of the audio thread 1204 even though the video thread 1203 cannot operate in the exclusive state.

However, when the multi-core processor system 100 runs the video replay application for the single-core processor system, all the exclusive control processing codes are executed as they are, so that the CPUs lock one another to hinder the processing from proceeding.

To prevent stalling of the processing, the developer may alter a program itself to a format suitable to the parallel processing. For example, the developer changes functional units or operation conditions included in the thread to thereby alter the program itself to a format suitable to the parallel processing. However, the multi-core processor system 100 according to this embodiment can effectively utilize the multi-core parallelism to the maximum.

Using the process table 301 and the synchronization information table 302 depicted in FIGS. 4 and 5, the multi-core processor system 100 executes the synchronization processing. An example of the procedure of the synchronization processing is depicted in FIGS. 13 to 15. FIG. 13 depicts an example of a procedure at the synchronous master CPU during the synchronization processing and FIGS. 14 and 15 depict an example of a procedure at a CPU to be synchronized during the synchronization processing. FIG. 14 is a flowchart when the synchronous signal receiving unit 311 is operating in the CPU to be synchronized and FIG. 15 is a flowchart when the synchronous signal receiving unit 312 is operating in the CPU to be synchronized. To simplify the description in the examples depicted in the flowcharts of FIGS. 13 to 15, the synchronous master CPU is assumed to be the CPU #1 and the CPU to be synchronized is assumed to be the CPU #4.

FIG. 13 is a flowchart of an example of a procedure at the synchronous master CPU during the synchronization processing. Initially, the CPU #1 executes the synchronous master thread in the user space and executes the processing of the synchronization processing unit 310 in the kernel space.

The CPU #1 executes ordinary processing (step S1301) and issues a system call as synchronous code included in the ordinary processing (step S1302). When the system call is issued, the CPU #1 transitions from a user mode to a kernel mode and executes the synchronization processing unit 310, which is executed in the kernel space.

The CPU #1 determines whether synchronous code has been detected (step S1305). Synchronous code refers to exclusive control code or barrier synchronous code. If synchronous code has not been detected (step S1305: NO), the CPU #1 again executes the operation at step S1305 after the elapse of a given period. During the elapse of the given period, the CPU #1 transitions to the user mode, for example, and executes the synchronous master thread or another other user thread.

If synchronous code has been detected (step S1305: YES), the CPU #1 acquires the number of CPUs to be synchronized from the process table 301 (step S1306), and extracts the CPUs to be synchronized from the process table 301 (step S1307). After the extraction, the CPU #1 registers the acquired number of CPUs to be synchronized and the extracted CPUs to be synchronized into the synchronization information table 302 (step S1308). After the registration, the CPU #1 broadcast-transmits the synchronous signal and the arrival count M=0 to the CPUs to be synchronized (step S1309).

After the transmission, the CPU #1 determines whether a ready signal has been received from all of the CPUs to be synchronized (step S1310). The processing of sending a ready signal is performed at steps S1408 and S1411 included in the processing of the CPUs to be synchronized. If not received (step S1310: NO), the CPU #1 again executes the operation at step S1310 after the elapse of a given period. If received (step S1310: YES), the CPU #1 notifies the synchronous master thread of completion of the synchronization processing (step S1311), and ends the process of the synchronization processing unit 310.

The CPU #1 transitions to the user mode and determines whether the completion of the synchronization processing has been accepted (step S1303). If not accepted (step S1303: NO), the CPU #1 again executes the operation at step S1303 after the elapse of a given period. If accepted (step S1303: YES), the CPU #1 executes the subsequent processing (step S1304), and ends the process of the synchronous master thread.

FIG. 14 is a flowchart (1) of an example of a procedure at the CPU to be synchronized during the synchronization processing. Initially, the CPU #4 executes a thread to be synchronized in the user space and, if a synchronous signal is received, executes the synchronous signal receiving unit 311 in the kernel space.

The CPU #4 executes ordinary processing (step S1401) and then executes critical section processing (step S1402). After completion of the critical section processing, the CPU #4 transitions from the user mode to the kernel mode as a result of receiving of the synchronous signal. If not critical section processing is present, the CPU #4 executes the process of the synchronous signal receiving unit 311 immediately after receiving the synchronous signal. The process of transmitting the synchronous signal is performed at step S1309 included in the process of the synchronous master CPU.

The CPU #4 increments the arrival count M (step S1404) and determines whether M=N is true (step S1405). If M=N is not true (step S1405: NO), the CPU #4 creates two duplicated shared memory areas 104 (step S1406). After the creation, the CPU #4 stops the synchronous signal receiving unit 311 and activates the synchronous signal receiving unit 312 (step S1407).

An example of a method of stopping the synchronous signal receiving unit 311 and activating the synchronous signal receiving unit 312 can be a method of switching the function to be executed. For example, the CPU #4 switches a function pointer, which is executed when a synchronous signal or a ready signal is received, from an address indicating code to execute the synchronous signal receiving unit 311 to an address indicating code to execute the synchronous signal receiving unit 312. As a result, when the CPU #4 receives the next synchronous signal or ready signal, the CPU #4 executes the processing of the synchronous signal receiving unit 312.

The CPU #4 then broadcast-transmits the ready signal and the arrival count M to the synchronization-object CPUs excluding the CPU #4 (step S1408). After the transmission, the CPU #4 sets the access destination of the subsequent processing to one of the duplicated shared memory areas 104 (step S1409) and instructs a thread that is to be synchronized to make a speculative execution of the subsequent processing (step S1410), and ends the process of the synchronous signal receiving unit 311.

If M=N is true (step S1405: YES), the CPU #4 broadcast-transmits the ready signal and the arrival count M to the synchronization-object CPUs, excluding the CPU #4 (step S1411). After the transmission, the CPU #4 instructs a thread that is to be synchronized to execute the subsequent processing (step S1412), and ends the process of the synchronous signal receiving unit 311. The CPU #4 having ended the process of the synchronous signal receiving unit 311 and transitioned to the user mode, executes the subsequent processing based on an instruction at steps S1410 and S1412 (step S1403), and ends the processing of the thread to be synchronized.

FIG. 15 is a flowchart (2) of an example of a procedure performed at the CPU to be synchronized during the synchronization processing. Referring to FIG. 15, description will be given of a case where the CPU #4 receiving a ready signal executes the process of the synchronous signal receiving unit 312 in the kernel space. Steps S1501 to S1503 indicating processes of the thread to be synchronized executed in the user space are equivalent to steps S1401 to S1403 depicted in FIG. 14 and therefore will not again be described. The processing of transmitting the ready signal is performed at steps S1408 and S1411 included in the process of the CPU to be synchronized.

The CPU #4 determines whether M=N is true (step S1504). If M=N is not true (step S1504: NO), the CPU #4 again executes the operation at step S1504 after the elapse of a given period. If M=N is true (step S1504: YES), the CPU #4 stops the synchronous signal receiving unit 312 and activates the synchronous signal receiving unit 311 (step S1505).

The CPU #4 then compares data of two duplicated shared memory areas 104 (step S1506). The CPU #4 determines whether the result of the comparison indicates coincidence (step S1507). If the comparison result indicates coincidence (step S1507: YES), the CPU #4 sets the access destination of the subsequent processing to the shared memory area 103 (step S1508) and instructs the thread that is to be synchronized to continue the speculative execution of the subsequent processing (step S1509).

If the comparison result does not indicate coincidence (step S1507: NO), the CPU #4 sets the access destination of the subsequent processing to the shared memory area 103 (step S1510) and interrupts the speculative execution of the thread to be synchronized (step S1511). The CPU #4 then instructs the thread that is to be synchronized to re-execute the subsequent processing (step S1512), and ends the process of the synchronous signal receiving unit 312. The CPU #4 transitioning to the user mode executes the subsequent processing based on an instruction at steps 1509 and 1512 (step S1503).

As set forth hereinabove, according to the synchronization method, the multi-core processor system, and the synchronization system, in the case of the synchronization processing of N CPUs, if the arrival count-at-the-synchronous-point M<N, data is duplicated for speculative execution, and if M=N, the speculative execution is continued if the duplication-source data is identical to the duplicate data. When redundant synchronization processing intrinsically free from the need for synchronization processing is executed, the duplicate data is not altered. Thus, by comparing the duplication-source data with the duplicate data, the multi-core processor system can determine whether the processing is redundant synchronization processing.

In the multi-core processor system, at least one of the CPUs may continue the execution of the processing after receiving the synchronous signal. As a result, the multi-core processor system can effectively utilize the otherwise wasteful wait time that arises with redundant synchronization processing.

The multi-core processor system can operate source code, as is, having redundant synchronization processing. It is extremely difficult to determine whether to actually execute the synchronization processing. Accordingly, conventional software includes redundant synchronization processing added from a failsafe approach, resulting in decreased performance. However, the multi-core processor system enables software having a redundant synchronization processing added thereto to be executed as is, thereby further enabling development costs to be reduced.

The multi-core processor system may continue the processing after the comparison if the duplication-source data and the duplicate data coincide, indicative of redundant synchronization processing and therefore, the multi-core processor system continues the speculatively executed processing, thereby enabling the wait time to be effectively utilized.

The multi-core processor system may interrupt the speculative execution if the duplication-source data and the duplicate data do not coincide, indicative of processing that is not redundant synchronization processing and therefore, the multi-core processor system interrupts the speculatively executed processing to thereby enable the subsequent processing to be executed without inconsistencies.

The multi-core processor system may determine the number of CPUs that are to perform the synchronization processing, based on a table representing a relationship between the processes and the CPUs. The table representing the relationship between the processes and the CPUs is a table preliminarily provided by the OS to manage the threads. Accordingly, the multi-core processor system is able to utilize an existing table as is to apply the synchronization method according to this embodiment, thereby enabling adoption costs to be reduced.

The multi-core processor system may create two duplicate data, e.g., first duplicate data and second duplicate data, from duplication-source data and, when comparing data, may compare the first duplicate data and the second duplicate data to determine whether the processing is a redundant synchronization processing. As the duplication-source data may be altered by the synchronous master CPU, the duplication-source data is not suitable as a reference for determining whether the speculatively executed processing alters the shared data. Accordingly, the multi-core processor system is able to determine more accurately whether the processing is redundant synchronization processing, by comparing the first duplicate data and the second duplicate data.

After receiving the synchronous signal transmitted from the synchronous master CPU, the multi-core processor system may deactivate the first receiving unit and activate the second receiving unit that receives a ready signal transmitted from the CPU to be synchronized. This enables the multi-core processor system to perform two different processes, one for a firstly received signal and another for a secondly received signal. Accordingly, the synchronous signal and the ready signal may be the same signal.

The synchronization method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect of the embodiments, drops in performance arising from redundant synchronization processing can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A synchronization method executed by a multi-processor system, the synchronization method comprising:
    sending, by a first CPU among a plurality of CPUs, a synchronous signal that is issued based on a synchronous command included in a synchronization processing to the plurality of CPUs excluding the first CPU, the plurality of CPUs accessing a first shared memory area to execute the synchronization processing;
    increasing, by a second CPU among the plurality of CPUs and different from the first CPU and based on receiving the synchronous signal from the first CPU, an arrival count for a synchronous point by one, the synchronous point indicating a position of the synchronous command in the synchronization processing and the arrival count indicating a number of CPUs arriving at the synchronous point among the plurality of CPUs;
    sending, by the second CPU, a ready signal indicating an arrival to the synchronous point, to the plurality of CPUs excluding the first CPU and the second CPU as a result of increasing the arrival count by one;
    creating, by the second CPU, a second shared memory area and a third shared memory area that are a duplication of the first shared memory area and accessing, by the second CPU, data stored only in the second shared memory area to execute a subsequent processing subsequent to the synchronization processing when the arrival count is not equal to count of the CPUs excluding the first CPU as a result of increasing the arrival count by one;
    when the arrival count is equal to the count of the CPUs excluding the first CPU as a result of receiving the ready signal from a CPU different from the second CPU and the first CPU:
        first comparing, by the second CPU, the second shared memory area and the third shared memory area,
        when a first comparing result indicates a coincidence, second comparing, by the second CPU, the first shared memory area and the second shared memory area,
        when a second comparing result indicates a coincidence, the CPUs excluding the first CPU are synchronized and the synchronization processing is complete,
        when the first comparing result or the second comparing result indicates a non-coincidence, interrupting and re-executing the subsequent processing.

2. A multi-processor system comprising:
    a first CPU, among a plurality of CPUs, that is configured to send a synchronous signal that is issued based on a synchronous command included in a synchronization processing to the plurality of CPUs excluding the first CPU, the plurality of CPUs accessing a first shared memory area to execute the synchronization processing; and
    a second CPU among the plurality of CPUs that is different from the first CPU and is configured to:

increase, based on receiving the synchronous signal from the first CPU, an arrival count for a synchronous point by one, the synchronous point indicating a position of the synchronous command in the synchronization processing and the arrival count indicating a number of CPUs arriving at the synchronous point among the plurality of CPUs;

send a ready signal indicating an arrival to the synchronous point to the plurality of CPUs excluding the first CPU and the second CPU as a result of increasing the arrival count by one;

create a second shared memory area and a third shared memory area by duplicating the first shared memory area and access data stored only in the second shared memory area to execute a subsequent processing subsequent to the synchronization processing when the arrival count is not equal to count of the CPUs excluding the first CPU as a result of increasing the arrival count by one;

when the arrival count is equal to the count of the CPUs excluding the first CPU as a result of receiving the ready signal from a CPU different from the second CPU and the first CPU:

first compare, by the second CPU, the second shared memory area and the third shared memory area, when a first comparing result indicates a coincidence, second comparing, by the second CPU, the first shared memory area and the second shared memory area, when a second comparing result indicates a coincidence, the CPUs excluding the first CPU are synchronized and the synchronization processing is complete, when the first comparing result or the second comparing result indicates a non-coincidence, interrupting and re-executing the subsequent processing.

3. The multi-processor system according to claim 2, wherein the second CPU is further configured to deactivate reception of the synchronous signal when the first comparing result or the second comparing result indicates the non-coincidence.

4. A synchronization system comprising:

a plurality of CPUs including at least a first CPU, the first CPU accessing a first shared memory area to execute synchronization processing, the first CPU being configured to send a synchronous signal that is issued based on a synchronous command included in a synchronization processing to the plurality of CPUs excluding the first CPU; and a second CPU among the plurality of CPUs and different from the first CPU configured to:

increase, based on receiving the synchronous signal from the first CPU, an arrival count for a synchronous point by one, the synchronous point indicating a position of the synchronous command in the synchronization processing and the arrival count indicating a number of CPUs arriving at the synchronous point among the plurality of CPUs, send a ready signal indicating an arrival to the synchronous point to the plurality of CPUs excluding the first CPU and the second CPU as a result of increasing the arrival count by one, create a second shared memory area and a third shared memory area by duplicating the first shared memory area and access data stored only in the second shared memory area to execute a subsequent processing subsequent to the synchronization processing when the arrival count is not equal to count of the CPUs excluding the first CPU as a result of increasing the arrival count by one, when the arrival count is equal to the count of the CPUs excluding the first CPU as a result of receiving the ready signal from a CPU different from the second CPU and the first CPU:

first compare, by the second CPU, the second shared memory area and the third shared memory area, when a first comparing result indicates a coincidence, second compare, by the second CPU, the first shared memory area and the second shared memory area, when a second comparing result indicates a coincidence, the CPUs excluding the first CPU are synchronized and the synchronization processing is complete, when the first comparing result or the second comparing result indicates a non-coincidence, interrupt and re-execute the subsequent processing.

* * * * *